United States Patent
Hu et al.

(10) Patent No.: US 10,142,909 B2
(45) Date of Patent: Nov. 27, 2018

(54) ARTIFICIAL INTELLIGENCE-AUGMENTED, RIPPLE-DIAMOND-CHAIN SHAPED RATELESS ROUTING IN WIRELESS MESH NETWORKS WITH MULTI-BEAM DIRECTIONAL ANTENNAS

(71) Applicants: The Board of Trustees of the University of Alabama, Tuscaloosa, AL (US); San Diego State University (SDSU) Foundation, San Diego, CA (US)

(72) Inventors: Fei Hu, Tuscaloosa, AL (US); Ke Bao, Tuscaloosa, AL (US); Sunil Kumar, San Diego, CA (US)

(73) Assignees: The Board of Trustees of the University of Alabama, Tuscaloosa, AL (US); San Diego State University (SDSU) Foundation, San Diego, CA (US)

(*) Notice: Subject to any disclaimer, the term of this patent is extended or adjusted under 35 U.S.C. 154(b) by 226 days.

(21) Appl. No.: 15/292,612

(22) Filed: Oct. 13, 2016

(65) Prior Publication Data
US 2017/0105163 A1    Apr. 13, 2017

Related U.S. Application Data

(60) Provisional application No. 62/240,690, filed on Oct. 13, 2015.

(51) Int. Cl.
*H04L 12/58* (2006.01)
*H04W 40/06* (2009.01)
(Continued)

(52) U.S. Cl.
CPC ............ *H04W 40/06* (2013.01); *G06N 7/005* (2013.01); *G06N 99/005* (2013.01);
(Continued)

(58) Field of Classification Search
None
See application file for complete search history.

(56) References Cited

U.S. PATENT DOCUMENTS

2003/0235175 A1* 12/2003 Naghian ................. H04L 12/66 370/338
2006/0120370 A1*  6/2006 Ginchereau ............ H04L 45/00 370/392

(Continued)

OTHER PUBLICATIONS

Akyildiz, et al., "Wireless mesh networks: a survey", Comput. Netw.47, 2005, 445-487.

(Continued)

*Primary Examiner* — Zewdu A Beyen
(74) *Attorney, Agent, or Firm* — Meunier Carlin & Curfman LLC

(57) ABSTRACT

Disclosed herein are systems and methods directed to routing in the wireless mesh network (WMN) with multi-beam directional antennas (MBDAs). The disclosed systems and methods describe Ripple-Diamond-Chain (RDC) shaped routing, systematic link quality modeling and artificial intelligence (AI) augmented path link selection. In simulations, real-time video as well as other types of traffic types are used to validate the high-throughput, quality of service (QoS)-differentiated, multi-beam routing efficiency of the disclosed systems and methods, as well as the intelligent path determination in dynamic WMN environments.

20 Claims, 26 Drawing Sheets

(51) Int. Cl.
| | |
|---|---|
| *G06N 7/00* | (2006.01) |
| *G06N 99/00* | (2010.01) |
| *H04W 40/02* | (2009.01) |
| *H04W 40/38* | (2009.01) |
| *H04L 12/721* | (2013.01) |
| *H04L 12/707* | (2013.01) |
| *H04W 84/18* | (2009.01) |

(52) U.S. Cl.
CPC ............ *H04L 45/123* (2013.01); *H04L 45/24* (2013.01); *H04W 40/02* (2013.01); *H04W 40/38* (2013.01); *H04W 84/18* (2013.01)

(56) References Cited

U.S. PATENT DOCUMENTS

| | | | | |
|---|---|---|---|---|
| 2007/0206521 | A1* | 9/2007 | Osaje | G01D 4/004 370/315 |
| 2007/0211636 | A1* | 9/2007 | Bellur | H04L 43/0882 370/238 |
| 2009/0073921 | A1* | 3/2009 | Ji | H04L 45/00 370/328 |
| 2011/0182253 | A1* | 7/2011 | Shekalim | H04W 28/18 370/329 |

OTHER PUBLICATIONS

Almobaideen, et al., "MSDM: Maximally Spatial Disjoint Multipath Routing Protocol for MANET", Communications and Network, vol. 5 No. 4, 2013, 316-322.

Bao, et al., "Transmission Scheduling in Ad Hoc Networks with Directional Antennas", Proceedings of the 8th annual international conference on Mobile computing and networking. ACM, 2002, pp. 48-58.

Cheng, et al., "Ripple: A Wireless Token-Passing Protocol for Multi-hop Wireless Mesh Networks", IEEE Communications Letters 10:2, 2006, 123-125.

Choudhury, et al., "Capture-aware Protocols for Wireless Multihop Networks using Multi-beam Directional Antennas", Technical report, VIUC, 2005, 16 pages.

Farid, et al., "A fuzzy logic approach for Quality of Service quantification in wireless and mobile networks", Local Computer Networks Workshops (LCN Workshops), 2014 IEEE 39th Conference, Sep. 2014, 629-636.

Huang, et al., "Intelligent Cooperative Spectrum Sensing via Hierarchical Dirichlet Process in Cognitive Radio Networks", IEEE Journal on Selected Areas in Communications (JSAC) 33:5, 2015, 771-787.

Huang, et al., "Multi-Task Spectrum Sensing in Cognitive Radio Networks via Spatio-Temporal Data Mining", IEEE Transactions on Vehicular Technology,vol. 62, Issue 2, 2013, 809-823.

Iannucci, et al., "No Symbol Left Behind: A Link-Layer Protocol for Rateless Codes", MobiCom 2012, 11 pages.

Jain, et al., "On-Demand Medium Access in Multihop Wireless Networks with Multiple Beam Smart Antennas", Parallel and Distributed Systems, IEEE Transactions on, vol. 19, No. 4, Apr. 2008, 489-502.

Johnson, et al., "Dynamic Source Routing in Ad-Hoc Wireless Networks", 1996, 18 pages.

Porcello, et al., "Designing and Implementing Multibeam Smart Antennas for High Bandwidth UAV Communications Using FPGAs", Aerospace Conference, 2013 IEEE, 2013, 1-12.

Santhi, et al., "Q-learning based adaptive QoS routing protocol for MANETs", Recent Trends in Information Technology (ICRTIT), 2011 International Conference, Jun. 2011,1233-1238.

Venkateswarlu, et al., "Node—link disjoint multipath routing protocols for wireless sensor networks—a survey and conceptual modeling", ADCONS, LNCS 7135, 2012, 405-414.

Wang, et al., "ISE03-6: An Intersection-Based Multipath Routing Scheme", Global Telecommunications Conference; GLOBECOM, 2006, 1-6.

Wu, et al., "A Learning-Based QoEDriven Spectrum Handoff Scheme for Multimedia Transmissions over Cognitive Radio Networks", IEEE Journal on Selected Areas in Communications,vol. 32, No. 11, 2014, 2134-2148.

Wu, et al., "Cross-layer Forward Error Correction Scheme using Raptor and RCPC Codes for Prioritized Video Transmission over Wireless Channels", IEEE Transactions on Circuits and Systems for Video Technology. Issue: 99, Jan. 2014, 2014, 1047-1060.

Zi-Tsan, et al., "QoS Provisioning for Wireless LANs Wth Multi-Beam Access Point", Mobile Computing, IEEE Transactions on, vol. 13, No. 9, Sep. 2014, 2113-2127.

* cited by examiner

TOTALLY DISJOINT

WITH INTERSECTIONS

DIAMOND CHAIN

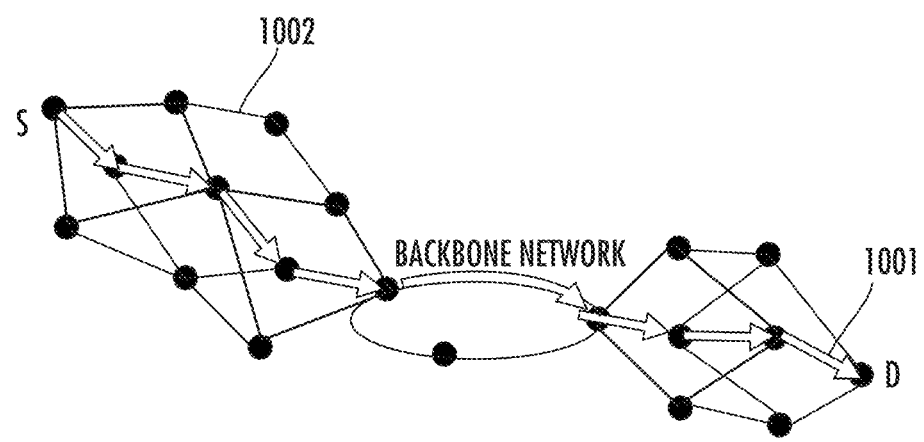
FIG. 10
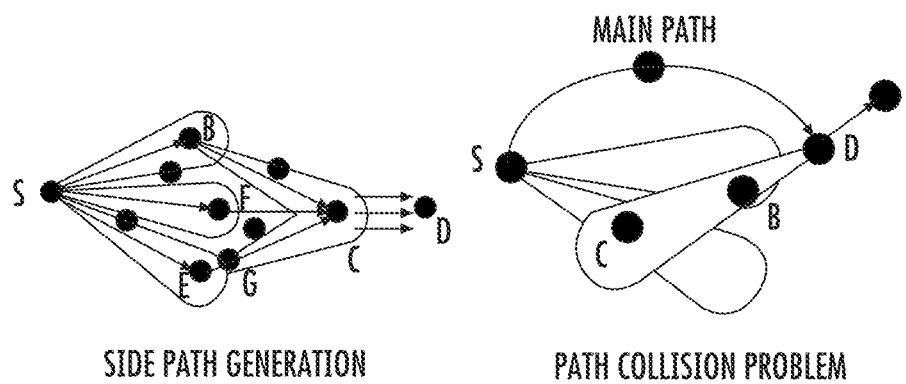
SIDE PATH GENERATION
FIG. 11A
PATH COLLISION PROBLEM
FIG. 11B

ROUTING DELAY

PACKET LOSS RATE

COMMON DSR

COMMON DSR + MULTI-BEAM MAC

RDC ROUTING + MULTI-BEAM MAC

COMMON DSR

DIAMOND-BASED, NO LEARNING

DIAMOND-BASED, USING Q-LEARNING

ARTIFICIAL INTELLIGENCE-AUGMENTED, RIPPLE-DIAMOND-CHAIN SHAPED RATELESS ROUTING IN WIRELESS MESH NETWORKS WITH MULTI-BEAM DIRECTIONAL ANTENNAS

CROSS REFERENCE TO RELATED APPLICATIONS

This application claims priority to and benefit of U.S. Provisional Patent Application Ser. No. 62/240,690 filed Oct. 13, 2015, which is fully incorporated by reference and made a part hereof.

GOVERNMENT SUPPORT CLAUSE

This invention was made with government support under FA8750-14-1-0075 awarded by the Department of Defense. The government has certain rights in the invention.

BACKGROUND

Wireless mesh networks (WMNs) have found widespread application due to their rapid wireless deployment potential, flexible network topology, low-cost maintenance, and large-scale radio coverage. Unlike Wi-Fi local area wireless computer networking technology, WMNs may not need cables between constituent wireless backbone nodes. These backbone nodes, which can be referred to as mesh routers (MRs), can serve as a tree root in networking terms. Each tree root MR can communicate with many different nodes in its tree. Each of these tree nodes can be called a mesh client (MC). The MC can use less resources (memory, CPU speed, link rate, and the like) than the MR. Moreover, MCs can send packets through the tree and reach a MR, which can reach another MR or use a gateway to talk with the Internet or other networks, as shown in FIG. 1.

Many of today's WMN products use omni-directional antennas. Omni-directional antennas can cause interference among neighboring nodes, excluding the specific node that the antenna intends to communicate with.

Directional antennas, on the other hand, can emit their energy within a small angle (called a beam). These directional antennas may not leak energy to neighboring nodes as long as they are not in the beam coverage area. Due to their well-focused energy, directional antennas can propagate the radio for longer distances than omni-directional antennas. However, directional antennas may only be able to target one direction at a time and can thus have blind-spots in other directions. This can limit the throughput performance of these types of antennas.

Multi-beam directional antennas (MBDAs), including multi-beam smart antennas (MBSAs), can overcome such limitations by allowing simultaneous packet transmissions in multiple beams in different directions. A MBDA can also simultaneously receive packets from multiple beams. The MBDA can moreover have lower associated costs than multiple-input and multiple-output (MIMO) antennas since no complex antenna control systems may be needed. However, conventional multi-hop wireless routing schemes may only search the shortest path between source and destination nodes. Such a scheme may only use one beam of the MBDA, and thus may not make use of other beams, leading to decreased throughput.

Therefore, what is needed are systems and methods for efficient routing in MBDA-equipped WMNs. The systems and methods can be used to maximize the throughput of a given routing scheme by exploiting the multi-beam transmission/reception capability of MBDAs.

SUMMARY

In one aspect, a method for the routing of data between a source and a destination in a WMN is described. The method can include first defining a main path between the source and destination in the WMN. The main path can include nodes in the WMN. Each node can be configured to receive and transmit data, and the nodes can be associated with MBDAs. Next, one or more side paths of the main path can be defined. The side paths can include other nodes in the WMN, each node configured to receive and transmit data. The data can then be routed between the source and the destination through the main path and the one or more side paths. At least a portion of the data being routed from the source to the destination can diverge from the main path to at least one of the side paths, and then converge from one of the one or more side paths to the main path while being routed from the source to the destination.

In one aspect, the a portion of data being routed can include the data being routed from at least one node having a first ripple identifier to a plurality of nodes having a second ripple identifier, and then from the plurality of nodes having the second ripple identifier to at least one node having a third ripple identifier.

The method further includes a multi-beam-oriented transmission control scheme that can be used to synchronize beam communication associated with the MBDA during the routing of the data between the source and the destination through the main path and the one or more side paths. The packet delivery in one or more time slots for the MBDAs can be bi-directional.

The method further includes using a cumulative distribution function (CDF) metric to characterize a statistical distribution of feedback delays during the routing of the data between the source and the destination through the main path and the one or more side paths. The method further includes a capture effect metric that can be used to characterize a probability of an MBDA being associated with at least one node being captured. The method further includes a diamond transmission probability metric that can be used to measure a probability of a node becoming part of the main path. The method further includes the CDF metric, the capture effect metric, and the diamond transmission probability metric being adjusted based on different quality-of-service (QoS) requirements associated with the data. The CDF metric can be used to determine a pause time for one or more nodes.

The fuzzy logic (FL) can be used to obtain a fused metric that includes the CDF metric, the capture effect metric, and the diamond transmission probability metric, wherein the fused metric measures a dynamic node quality of at least one node. The fused metric can be used for a reward calculation in a reinforcement learning (RL)-based path search. The FL further includes a Simple Additive Weighting Method (SAW). The SAW includes a decision matrix. The decision matrix includes weights that can be adjusted based on different QoS requirements for the data.

The online learning can be used while routing data between the source and the destination through the main path and the one or more side paths. The CDF metric can be obtained through the online learning. The online learning algorithm includes Gaussian approximation or Maximum-Likelihood (ML) estimation.

The one or more rateless codes can be used to encode the data into symbols. The main path avoids nodes that can be easily captured. The method further includes defining and using a capture seriousness level for a node while routing data between the source and the destination through the main path and the one or more side paths.

A neighbor table can be associated with a node and the neighbor table contains information about one or more accessible two-hop neighbor nodes from the said node and one or more beam IDs through which the said node can reach the two-hop neighbor nodes. A neighbor table can moreover be associated with a node and the neighbor table contains information about one or more accessible one-hop and one or more two-hop neighbor nodes from the said node and one or more beam IDs through which the said node can reach one or more of the one-hop neighbor nodes and the two-hop neighbor nodes.

A Q-learning process can be implemented for the routing of the data between the source and the destination in the WMN. The Q-learning includes a Markov decision process (MDP) process.

The routing of the data between the source and the destination in the WMN can be determined by maximizing expected rewards of all the nodes.

In another aspect, a system for the routing of data between a source and a destination in a WMN is described. The system can include a plurality of nodes, wherein a portion of the nodes are associated with an MBDA and a processor configured to execute computer-implemented code. The processor can execute the computer-implemented code to first defining a main path between the source and destination in the WMN. The main path can include nodes in the WMN. Each node can be configured to receive and transmit data, and the nodes can be associated with MBDAs. Next, one or more side paths of the main path can be defined. The side paths can include other nodes in the WMN, each node configured to receive and transmit data. The data can then be routed between the source and the destination through the main path and the one or more side paths. At least a portion of the data being routed from the source to the destination can diverge from the main path to at least one of the side paths, and then converge from one of the one or more side paths to the main path while being routed from the source to the destination.

In one aspect, the a portion of data being routed can include the data being routed from at least one node having a first ripple identifier to a plurality of nodes having a second ripple identifier, and then from the plurality of nodes having the second ripple identifier to at least one node having a third ripple ID.

The system further includes a multi-beam-oriented transmission control scheme that can be used to synchronize beam communication associated with the MBDA during the routing of the data between the source and the destination through the main path and the one or more side paths. The packet delivery in one or more time slots for the MBDAs can be bi-directional.

The system further includes using the processor executing the computer-implemented code to define a cumulative distribution function (CDF) metric to characterize a statistical distribution of feedback delays during the routing of the data between the source and the destination through the main path and the one or more side paths. The system further includes the processor executing the computer-implemented code to define a capture effect metric that can be used to characterize a probability of an MBDA being associated with at least one node being captured. The system further includes the processor executing the computer-implemented code to define a diamond transmission probability metric that can be used to measure a probability of a node becoming part of the main path. The system further includes the processor executing the computer-implemented code to adjust the CDF metric, the capture effect metric, and the diamond transmission probability metric based on different quality-of-service (QoS) requirements associated with the data. The CDF metric can be used to determine a pause time for one or more nodes.

The fuzzy logic (FL) can be used to obtain a fused metric that includes the CDF metric, the capture effect metric, and the diamond transmission probability metric, wherein the fused metric measures a dynamic node quality of at least one node. The fused metric can be used for a reward calculation in a reinforcement learning (RL)-based path search. The FL further includes a Simple Additive Weighting Method (SAW). The SAW includes a decision matrix. The decision matrix includes weights that can be adjusted based on different QoS requirements for the data.

The online learning can be used while routing data between the source and the destination through the main path and the one or more side paths. The CDF metric can be obtained through the online learning. The online learning algorithm includes Gaussian approximation or Maximum-Likelihood (ML) estimation.

The one or more rateless codes can be used to encode the data into symbols. The main path avoids nodes that can be easily captured. The system further includes defining and using a capture seriousness level for a node while routing data between the source and the destination through the main path and the one or more side paths.

A neighbor table can be associated with a node and the neighbor table contains information about one or more accessible two-hop neighbor nodes from the said node and one or more beam IDs through which the said node can reach the two-hop neighbor nodes. A neighbor table can moreover be associated with a node and the neighbor table contains information about one or more accessible one-hop and one or more two-hop neighbor nodes from the said node and one or more beam IDs through which the said node can reach one or more of the one-hop neighbor nodes and the two-hop neighbor nodes.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 10 shows a schematic of the diamond chain routing, highlighting the addition of side paths to the main path;

FIGS. 11A-11B show representative schematics of (FIG. 11A) side path generation and (FIG. 11B) path collision situations;

DETAILED DESCRIPTION

Figure 1:
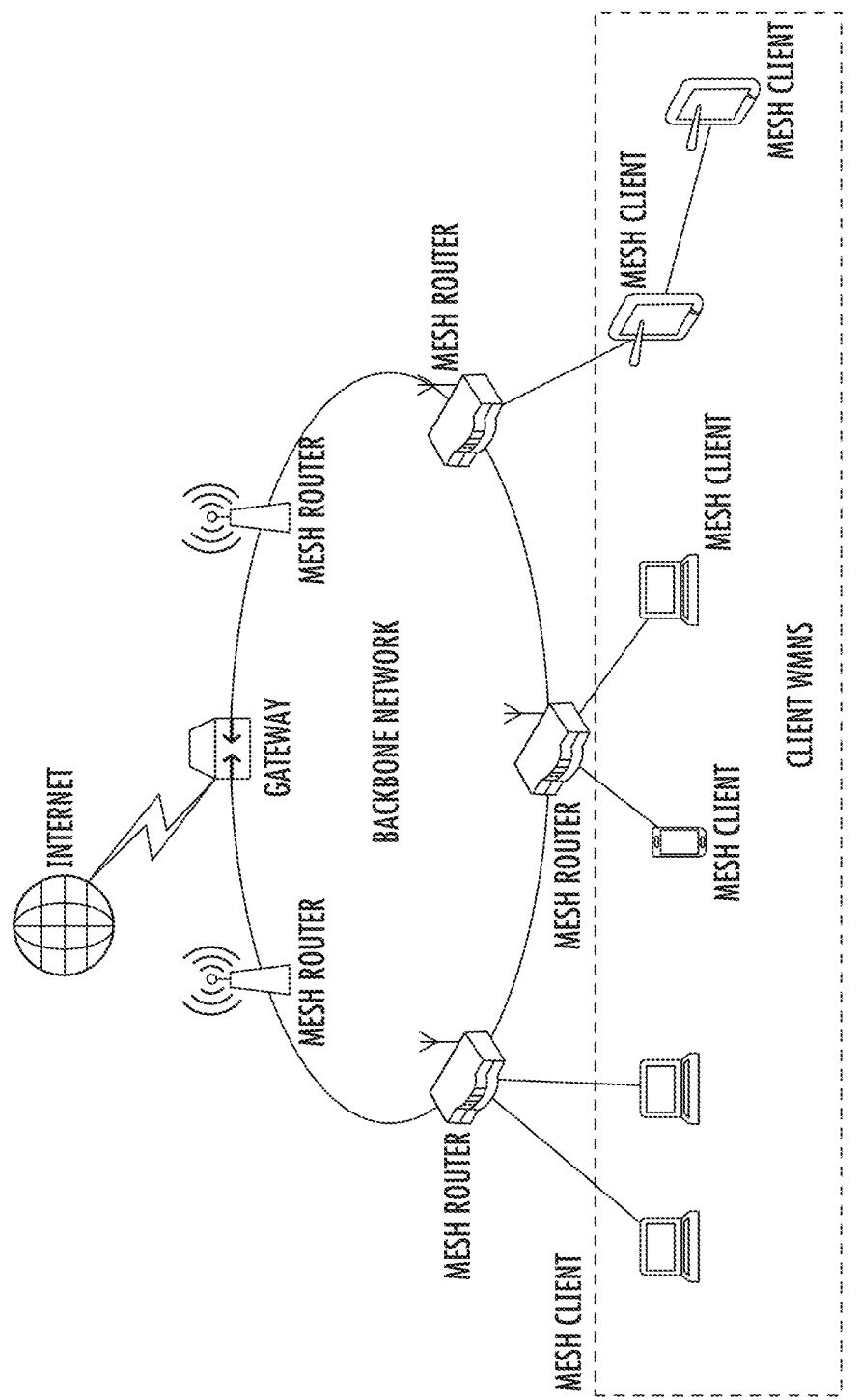
FIG. 1 show an exemplary WMN architecture in accordance with aspects of this disclosure.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed herein are systems and methods that describe efficient routing in MBDA-equipped WMNs. The systems and methods can be used to maximize the throughput of a given routing scheme by exploiting the multi-beam transmission/reception capability of MBDAs. Conventional multi-hop wireless routing schemes may only search the shortest path between source and destination nodes. Such a scheme may only use one beam of the MBDA, and thus may not make use of other beams, leading to decreased throughput. The systems and methods disclosed herein do not simply use existing multi-path routing schemes because those existing routing schemes may not have tight control of the convergence of the beams comprising the paths.

Moreover if the paths taken by the routing scheme are widely disjoint, there can be a few nodes located in the intersections of multiple paths. Only those intersection nodes may use multiple beams. Thus most nodes still use single-beam communications since they may only need to talk with one node in the next hop of the routing.

Another consideration is that the WMN multi-beam routing scheme may be used under highly diversified radio conditions. This can mean that each region and associated nodes can have different link qualities. For example, some links may be affected by fast channel fading.

The use of directional antennas further complicates communication conditions due to node capture phenomenon. Such node capture phenomena can refer to conditions where one or multiple beams may be stuck in a carrier listening state because other nodes' data transmissions are ongoing in those directions. The nodes may have to continue listening and/or the nodes can perform window backoff (for example, in the MAC layer). Thus existing schemes can waste time detecting unproductive traffic, e.g., a given node detecting packets that are not intended for the said node.

Node selection does not consider the comprehensive, long-term link quality state change may result in sub-optimal routing. Markov-like state transition model may be used to capture link state changes (in terms of fading, capture, interference, and the like) at different times. The path establishment can then select each link based on a node state transition model.

Hence in one aspect, the routing of data between a source and a destination in a WMN can include first defining a main path between the source and destination in the WMN. The main path can include nodes in the WMN. Each node can be configured to receive and transmit data, and the nodes can be associated with MBDAs. Next, one or more side paths of the main path can be defined. The side paths can include other nodes in the WMN, each node configured to receive and transmit data. The data can then be routed between the source and the destination through the main path and the one or more side paths. At least a portion of the data being routed from the source to the destination can diverge from the main path to at least one of the side paths, and then converge from one of the one or more side paths to the main path while being routed from the source to the destination.

Figure 2:
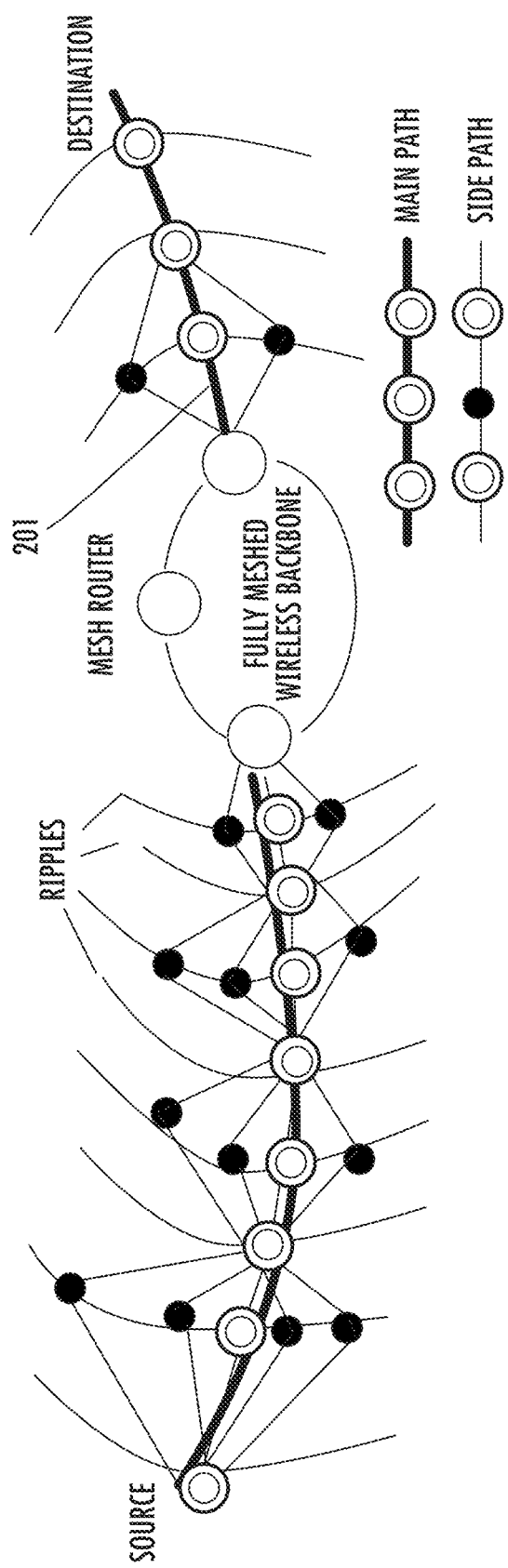
FIG. 2 show a schematic of the disclosed Ripple-Diamond-Chain Routing (RDC) scheme.

In one aspect, a WMN routing scheme is described that can use multi-beam antennas through ripple-diamond-chain (RDC) transmission. The scheme is illustrated in FIG. 2. Nodes belonging to the same 'ripple' can have the same number of hops to the MR. Such ripples can be identified by ripple identifiers (IDs), which can be easily determined through popular ad hoc network routing protocols such as Ad hoc On Demand Distance Vector (AODV) or Dynamic Source Routing (DSR).

In another aspect, the data being routed from the source to the destination includes the data being routed from at least one node having a first ripple identifier to a plurality of nodes having a second ripple identifier, and then from the plurality of nodes having the second ripple identifier to at least one node having a third ripple ID.

To form a RDC topology, the main path can be first established. The main path can consists of a series of links with the best statistical-determined qualities (for example, a minimum antenna capture probability, among other considerations) among all the links in the same ripple range. To utilize the node multi-beam communication capability, some side paths can also be established by recruiting the nodes in the same ripple to forward data. Those main path nodes can become the multi-beam divergence/convergence points (for traffic diffusion and aggregation). All the nodes in the main path and side paths can form a chain of diamond-like connections. The ripples, moreover, can resemble water waves: when one ripple is sending data, the next ripple may only be able to receive data. However, nodes that are two or more ripples away can also send data for enabling pipelined transmissions. Therefore, besides a diamond chain formation, a ripple-to-ripple transmission schedule control scheme in the RDC-based routing is also described.

In various implementations, systems and methods are disclosed that describe how to establish the main path, how to overcome fast fading in multiple beam scenarios, and how to address multi-beam transmission protocols in each ripple.

The main path does not necessarily have the shortest distance to the MR. Moreover, conventional ad hoc routing schemes may not be directly applicable because they do not aim to select a path with the best cumulative, long-term channel quality across all individual links.

Fast fading radio environments can be widespread in WMNs deployed in congested cities or other places with many moving obstacles between the mesh nodes with the network nodes being relatively static. It may not be realistic to select an accurate sending rate in each link that matches with channel conditions since the link quality can change at the sub-packet level. Rateless codes may be used to overcome such shortcomings since such codes may not need to adjust the sending rates explicitly and instead send encoded packet pieces (called 'symbols'). The receiver can use partial symbols to reconstruct the original packet. However, the integration of the rateless codes with the multi-beam transmission can still be a problematic issue.

RDC routing includes ripple-to-ripple localized communications that can belong to the MAC layer. The disclosed routing scheme can be integrated with an efficient multi-beam MAC in each ripple. Moreover, a multi-beam-oriented transmission control scheme can be used to synchronize beam communication associated with the MBDA during the routing of the data between the source and the destination through the main path and the one or more side paths. This scheme may be needed because a MBDA may not allow a part of the beams to be in transmission status and the rest to be in reception status, but rather all antenna beam elements are typically in the same communication mode. This can be implemented to prevent a situation where one beam's signal leaks out of its side lobs and causes interference to the main lobes of other beams.

Moreover, the control of alternative sending and receiving operations across all the ripples in the main path and side paths can also require further control.

Figure 3:
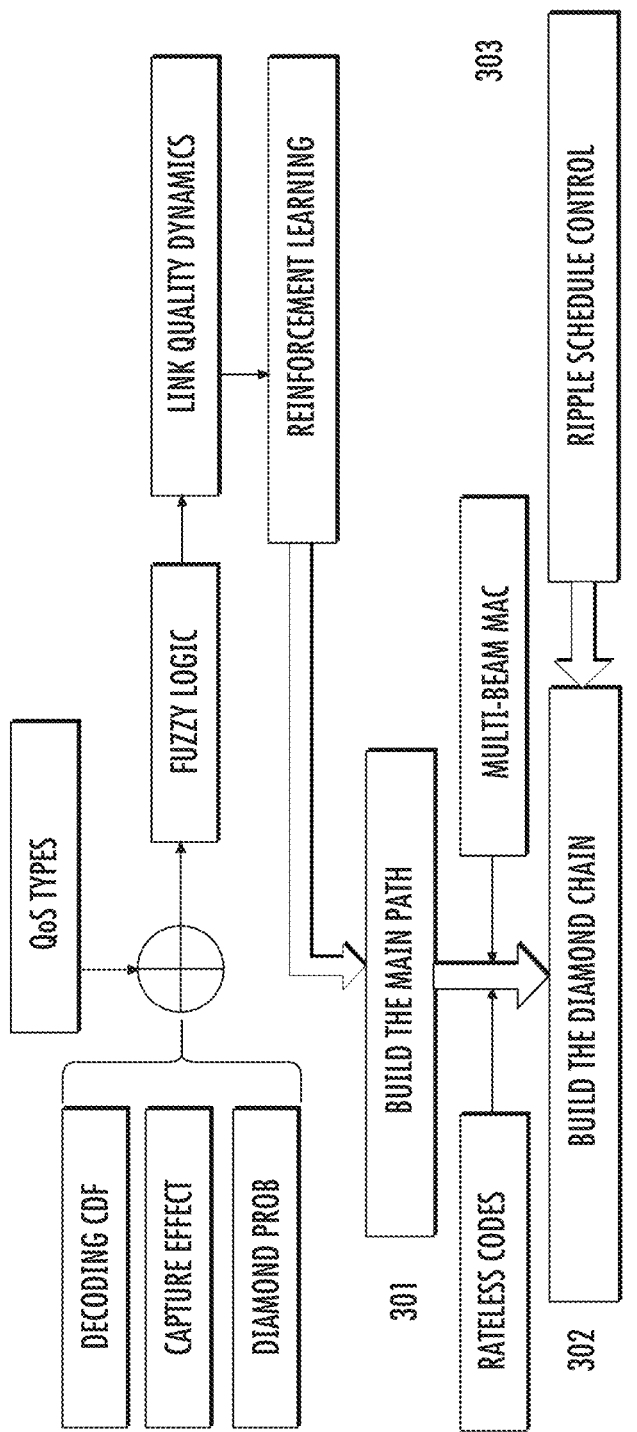
FIG. 3 shows a block diagram of the functional modules associated with the disclosed systems and methods.

In one aspect of the disclosure, a series of tightly coupled function modules, as illustrated in FIG. 3, are described. The three modules are main path search (see FIG. 2, 201) 301, diamond chain formation (comprising the main path and side paths) 302, and ripple schedule control (for ripple-to-ripple, pipelined transmissions) 303.

To achieve task 301, the weighted sum of different link quality metrics are first defined. This includes defining a decoding cumulative distribution function (CDF), which reflects the statistical distribution of ACK feedback delays during the transmission of rateless coded packets. Secondly, capture effects can be defined, which reflect the possibility of a node's directional antennas being captured by unproductive traffic. Finally, a diamond transmission probability can be defined, which can measure the possibility of a link becoming part of the main path of a diamond-chain routing. Based on different QoS requirements, the weights of these three metrics can be adjusted. Fuzzy logic (FL) can then be used to obtain a fused metric that measures the dynamic link quality. Such a link quality can be used for a reward calculation in a reinforcement learning (RL)-based path searching. A low-complexity RL algorithm can generate the main path.

To achieve task 302, side paths can be added to the main path to form a diamond chain routing architecture. Rateless codes can then be used to encode the packets into different pieces (i.e., symbols), and dispatch the symbols to multiple beams. In each ripple (i.e., one-hop neighborhood), a multi-beam MAC protocol can be used to achieve collision-free neighborhood communication.

Task 303 can be addressed through a pipelined ripple-to-ripple schedule control scheme.

In summary, aspects of the disclosure include: a comprehensive link quality measurement model based on the weighted integration of packet delay, antenna capture effects, and diamond transmission probability; a RDC-shaped multi-beam routing protocol with multi-beam rateless codes transmission as well as the ripple-to-ripple schedule control; and an artificial intelligence (AI) augmented main routing path establishment scheme based on FL and RL algorithms.

Multi-Beam Network Protocols

Figure 4:
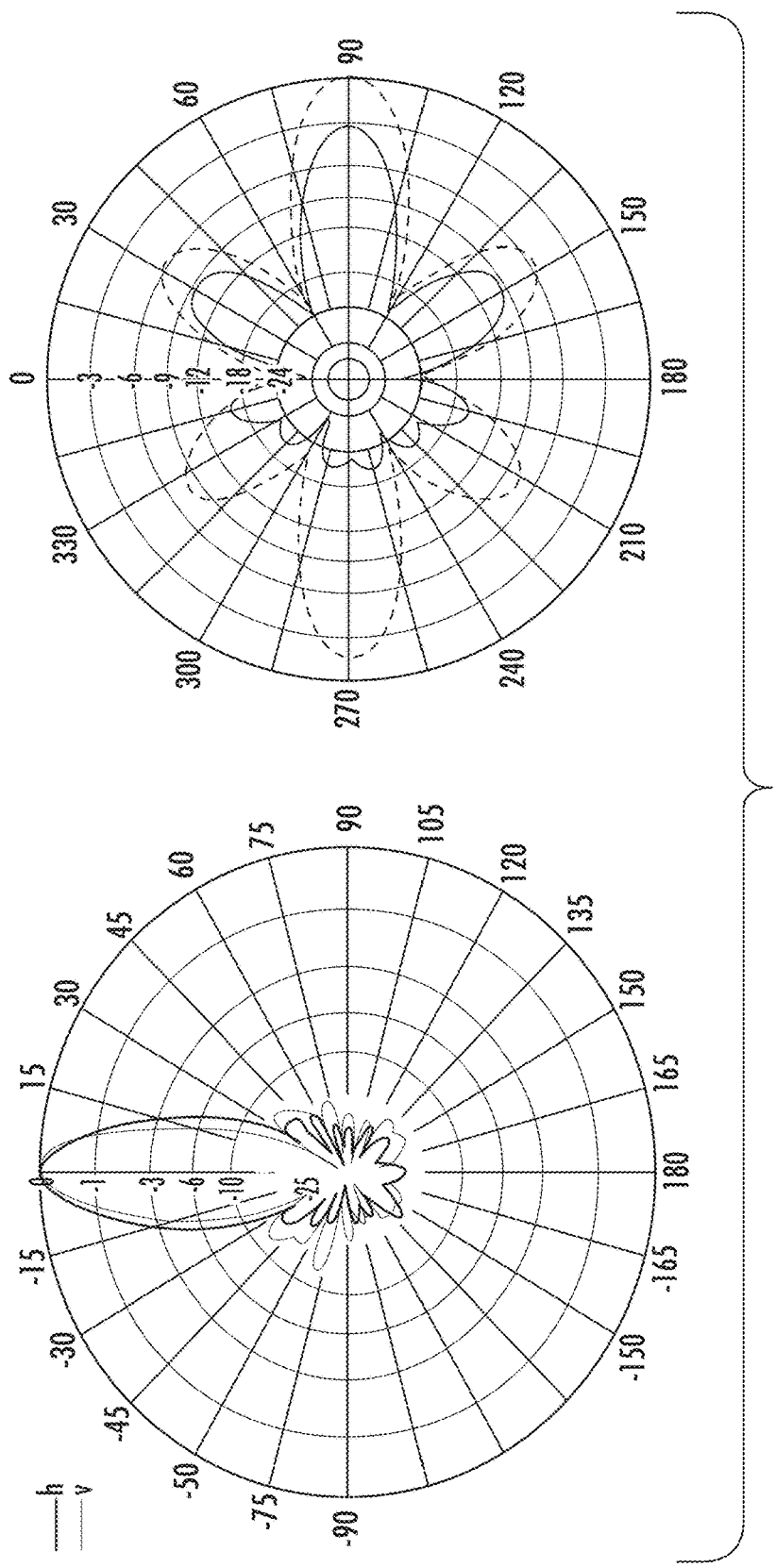
FIG. 4 shows examples of directional antennas operating in (1) single-beam (left) and (2) multi-beam (right) mode.

FIG. 4 shows examples of directional antennas operating in (1) single-beam (left) and (2) multi-beam (right) mode. A MBDA (see FIG. 4) can detect incoming signals in any beam, for example, by using Direction of Arrival (DoA) estimation. Moreover, if it switches from transmission (Tx) to receiving (Rx) mode, or from Rx to Tx mode, all beams may need to be switched together into the same mode. This may be the case because all antenna hardware elements may need to be synchronized into the same antenna weight vector control. Once the multi-beam antenna switches to Tx mode, the destination nodes in all beams can get ready for reception at the same time, otherwise, the beam bandwidth may be wasted.

Little research has been performed on the special network protocols designed for MBDAs. Most of the performed research assumes single-beam directional antennas. A few studies exist on how to optimize MAC protocols to exploit MBDA benefits. For example, an enhanced 802.11 distributed coordination function (DCF) framework is proposed in "Jain, Vivek; Gupta, A.; Agrawal, D. P., "On-Demand Medium Access in Multihop Wireless Networks with Multiple Beam Smart Antennas," in *Parallel and Distributed Systems, IEEE Transactions on*, vol. 19, no. 4, pp. 489, 502, April 2008," incorporated by reference, in order to achieve concurrent multi-beam transmissions.

In "4 Zi-Tsan Chou; Cong-Qi Huang; Chang, J. M., "QoS Provisioning for Wireless LANs With Multi-Beam Access Point," in Mobile Computing, IEEE Transactions on, vol. 13, no. 9, pp. 2113, 2127, September 2014," also incorporated by reference, the point coordination function (PCF) enhancement is described in order to adapt to multi-beam QoS requirements. Moreover, a well-controlled multi-beam scheduling protocol is discussed in, "Lichun Bao and J. J. Garcia-Luna-Aceves. "Transmission scheduling in ad hoc networks with directional antennas," in *Proceedings of the 8th annual international conference on Mobile computing and networking* (MobiCom '02). ACM, New York, N.Y., USA, 48-58," incorporated by reference.

The establishment of a high-throughput routing scheme in a fast fading, MBDA-equipped WMN, as described herein, has not previously been addressed. Moreover, RDC-shaped routing with rateless coded traffic control as disclosed herein has not previously been studied.

Multi-Path Routing

Figure 5A:
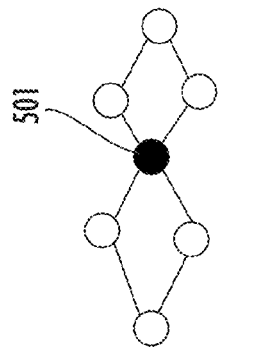
FIGS. 5A-5C show various examples of multi-path routing including (FIG. 5A) multi-path routing that is totally disjoint, (FIG. 5B) multi-path routing with intersections, and (FIG. 5C) multi-path routing that has a diamond chain style.
Figure 5B:
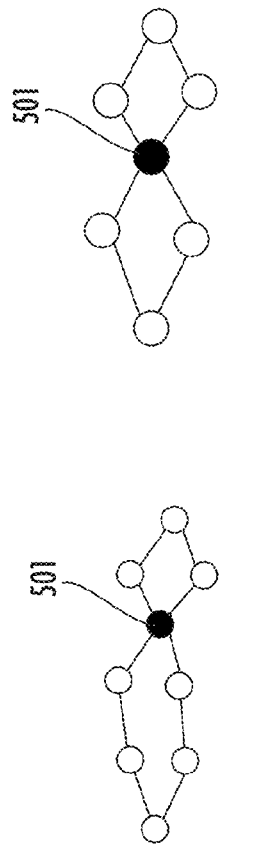
Figure 5C:
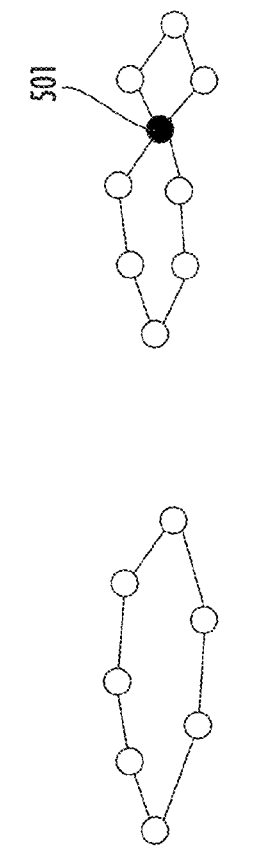

Multi-path routing can overcome the impacts of fast fading channels by distributing the packets to multiple paths. It can put more traffic load in better paths. Some methods aim to find totally disjoint paths in order to avoid the impact of any single-point failure (FIG. 5A). Most methods allows the existence of some intersection nodes among multiple paths (FIG. 5B). In aspects of the present disclosure, the systems and methods can use the capability of multi-beam transmissions, and each intersection node (e.g. 501) can have enough buffer size to hold the aggregated traffic from other nodes' beams. All the aggregation nodes can be in the main path, which can have the best overall link quality from a statistical point of view. Therefore, the diamond chain architecture (see FIG. 5C) tightly controls each hop (ripple) of traffic divergence and convergence schedules.

AI-Enhanced Routing

AI algorithms can add intelligence to wireless networking. RL can be used to solve cognitive radio spectrum handoff issues. Moreover, Bayesian learning can be used to detect idle spectrum in cognitive radio. Disclosed herein are systems and methods that describe AI-based multi-beam routing in WMNs using both FL and RL to search the main path under fast fading channel conditions.

FL-Based Link Quality Dynamics Modeling

In this section, the link quality dynamics are modelled. A metric can be defined that indicates how good a link is, in terms of becoming a part of the main path. Such a metric can be an integrated value because multiple factors may need to be considered that contribute to the link quality.

In an aspect of the disclosure, the following four factors can be considered: (1) Rateless codes CDF: rateless codes can integrate with the multi-beam architecture, and CDF can indirectly reflect the link dynamics under fast fading; (2) Capture effect: when a directional antenna is engaged in the continuous listening of unproductive traffic flow and cannot respond to traffic, the capture effect can occur. The main path can avoid those links that can be easily captured; (3) Bandwidth: this can refer to the link rate between the beams of the sender and receiver nodes; (4) Diamond transmission probability: this can measure how likely a node will join the main path. A node with more high-quality beams (links) can more likely participate in the side paths for a main path and can be more qualified for participating in the diamond chain routing process.

Moreover the upcoming sections also disclose how FL can be used to perform weighted integration of these factors. The disclosed FL scheme can automatically assign different weights to each factor based on the QoS requirements of five typical traffic classes.

Rateless Code CDF

Rateless codes can automatically adapt to fast fading channel conditions without the need of sending rate adjustments. While conventional wireless networks may need to select the proper sending rate among a few pre-fixed ones, rateless codes can continuously send out the encoded packet pieces (called symbols). If the ACK is received, the receiver can reconstruct a packet from the symbols; the sender can then send the symbols of the next packet. Otherwise, the sender keeps sending the symbols of the last packet until the ACK arrives. Note that the receiver does not need to receive all pieces to recover the original packet. A coded packet may only need small amount of redundancy to well recover the original packet. Rateless codes can be integrated into the disclosed multi-beam transmission architecture.

Figure 6:
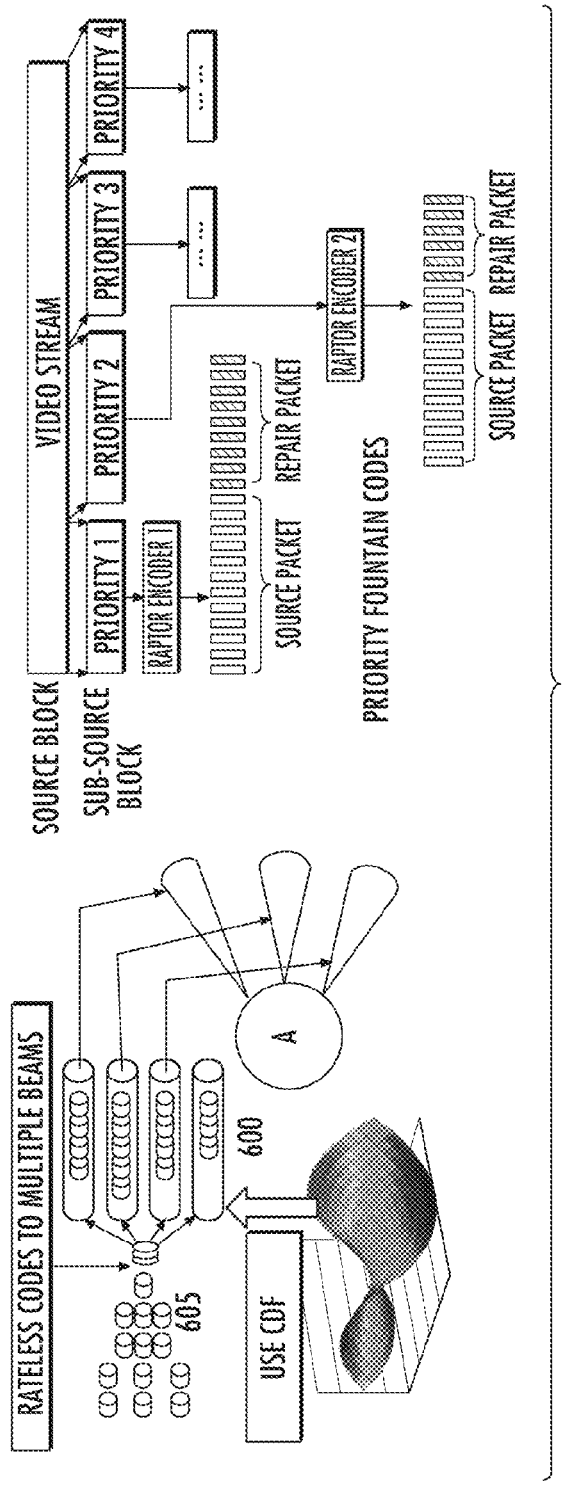
FIG. 6 shows conventional cumulative distribution function (CDF)-based rateless codes for multi-beam transmission (left) and the rateless codes in accordance with the disclosed systems and methods (right)

As shown in FIG. 6, by assigning the symbols to different beams, redundant packet pieces can be distributed to redundant links. More symbols (i.e., a longer queue size) can be allocated to better quality beams (shown in FIG. 6, left part). Multiple beams of individual nodes can be used for data forwarding in order to improve the throughput. The four beams 600 can represent four beams of a node. A number of small cylinders 605 illustrate the segments encoded by the rateless code. For a given data flow, the data can first be encoded by the rateless code to a number of symbols. These symbols can then be distributed into the four beams (600) and forwarded by the beams at the same time to next hop.

Conventional fountain codes can encode the packets based on their priority levels (FIG. 6; right part). Higher priority packets can have higher redundancy (and can thus be more easily recovered).

Because such codes are rateless, they can prevent a direct observation of the link quality. The link quality may need to be observed, however, for the establishment of the main path. In one aspect of the disclosure, the CDF can be used to measure the link quality. The CDF can be defined as the probability with which the encoded packet can be recovered successfully without errors after a certain number of symbols (n) have been received. Such a probability distribution (e.g., CDF curves) can increase monotonically with the number of symbols received. The CDF curve, i.e. a probability distribution density (PDF), can be sensitive to encoding parameters, channel conditions, code block length, and the like. A relatively small number of records can be collected on the relationship between n (the number of symbols sent between two consecutive pauses) and r (an ACK feedback delay), in order to obtain the CDF curve.

One advantage of CDF is that it can provide a knowledge of the proper pause time for the sender. Hence in one aspect, the CDF metric can be used to determine a pause time for one or more nodes.

The knowledge of the CDF metric can be derived from the PDF curves (probability vs. number of symbols). Without using CDF, the sender may need to pause each time after sending the minimum number of symbols for each packet. If the receiver still cannot re-assemble packet #1 (FIG. 7, left part), then no ACK may be sent back. But even so, at least a few milliseconds of time may have been wasted due to the pause time between the finishing of the minimum number of symbols and the transmission of more symbols (all for packet #1).

Figure 7:
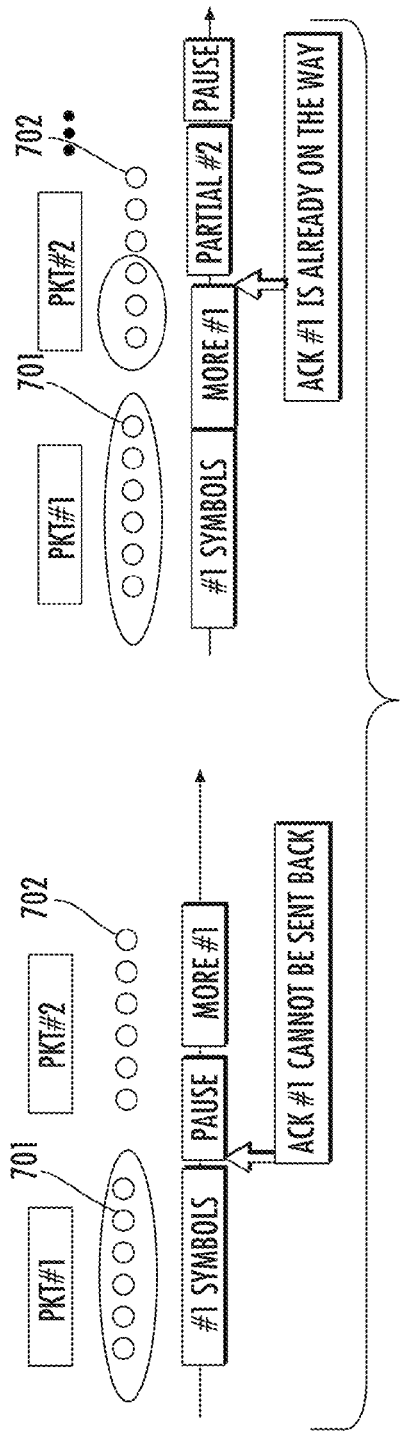
FIG. 7 shows aspects of packet transmission without using CDF and packet transmission with using CDF.

When CDF is used (FIG. 7, right part), the sender already has the statistical distribution of how many symbols it should send before each pause. Therefore, the sender can choose to pause in the right time after sending the minimum packet #1 symbols, plus some extra symbols for packet #1 (in case the channel condition is poor). Because the ACK takes some time to get back to the sender side (ACK can occupy approximately over 18% of communication overhead), the sender can simply send part of packet #2's symbols before its first pause. As shown in FIG. 7 (right), while the ACK for packet #1 is under way, the sender has sent out quite a few useful symbols for both packets #1 and #2, and then pauses at the right time to wait for ACK of packet #1 (the CDF curve tells us that the ACK should arrive at that time).

More specifically, in FIG. 7, the circles (701 and 702) stand for symbols from different packets, as relates to rateless code generation and transmission. At the sender side, the rateless code can continuously generate redundant code for a given packet. While there may be some data loss during the transmission, the receiver still can recover the entire packet as long as it obtains enough redundant codes for the said packet. This feature can be used to prevent extra overhead from retransmission, using, for example, Transmission Control Protocol/Internet Protocol (TCP/IP). In TCP/IP, once the receiver cannot recover a packet, the sender may have to retransmit the packet. If rateless codes are used, the sender can continue to send the redundant code of the said packet until it is successfully recovered by the receiver.

One advantage of the disclosed systems and methods can be that the decoding CDF can be obtained through an online learning algorithm, for example, through Gaussian approximation or Maximum-Likelihood (ML) estimation. In one aspect of the disclosure, the average ACK waiting delay within a unit time (such as approximately one second) can be taken as the node quality metric:

$$\overline{A}=[\Sigma_i(t_{i+1}-t_i)]/M,$$

where $t_i$ is the pause time instant, and M is total pause times measured in the unit time.

Capture Effect

Figure 8:
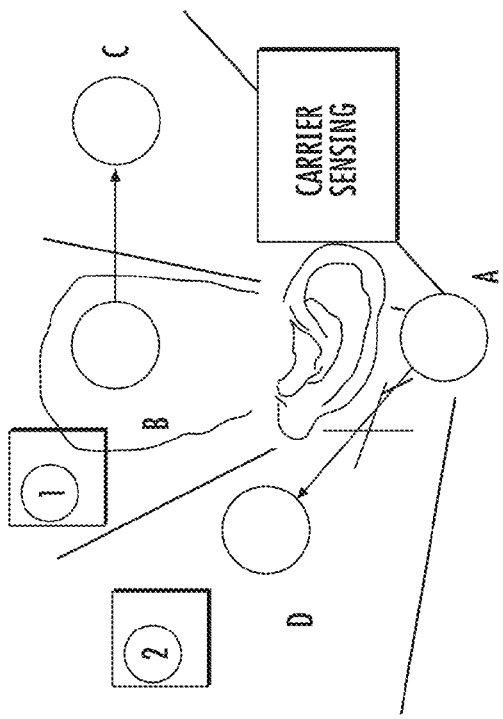
FIG. 8 illustrates example aspects of the capture effect.

As long as a directional antenna is used for aspects of the disclosed systems and methods, the capture effect can occur. As shown in FIG. 8, assume node A has data for node D (in beam 1). Before A sends data to D, it can detect that there is a signal in beam 2. This can be because B is sending data to C. A may get stuck in carrier listening status (i.e., be captured by B's traffic) as a result of carrier sense multiple access (CSMA)-based MAC protocols. This may be because A may believe that beam 1 has traffic for itself. Thus A may not be able to send data to D since the multi-beam antenna can require that all beams are in sending or receiving status simultaneously. If A prepares to be in receiving state in beam 1, it may not allow beam 2 to be in sending status. One way to overcome this can be to turn off beam 1 if A knows there will be no data for itself in the next communication phase. But the multi-beam antenna may keep all beams in the "on" state in case that there is data coming in any direction. To build a high-quality main path in RDC-based routing, the links with a high probability of being captured by other nodes should be avoided.

In one aspect of the disclosed systems and methods, a capture seriousness level can be defined for a particular node to address the capture effect issues. An indicator, $I_{ij}$, can first be defined. If the indicator takes on a value of "1", that can mean that node i is currently participating in active communications in beam j. Otherwise, the indicator can take on a value of "0". Even though node i itself may not be actively communicating with any node (i.e., $I_{ij}=0$), it can still be captured by other neighboring nodes. In this respect, $U_{ij}$ can be defined as the capture probability for node i captured by nodes in beam j. $U_{ij}$ can be obtained through the use of historical capture event statistics in different beams of node i.

Assuming that there are total M beams, the total capture seriousness level of node i, can be defined as follows:

$$C_i=\Sigma_{j=0}^{M}\{W_1\times I_{ij}+W_2\times U_{ij}\}.$$

Here $W_1$ and $W_2$ can depend on the importance of productive and unproductive traffic in node i, and $W_1+W_2=1$. Since unproductive traffic can contribute the most to the capture effect, in this disclosure, $W_1=0.3$, and $W_2=0.7$.

Hence in one aspect the systems and methods disclosed herein can include defining and using a capture seriousness level for a node while routing data between the source and the destination through the main path and the one or more side paths of the WMN.

Link Bandwidth

This metric can directly reflect the capacity of a link in any beam (direction). Generally, the bandwidth measurement can be obtained by the effective working time in a certain period, which can be defined as:

$$CITR=\frac{\text{idle time period}}{\text{monitoring time period}}$$

Then the CITR can be updated in a weighted format, depending on how the importance of history long-term average is evaluated in addition to a recent CITR value (this is similar to Internet RTT estimation):

$$CITR\leftarrow(1-\alpha)\times CITR+\alpha\times CITR_i$$

where $CITR_{i-1}$ and $CITR_i$ can denote the previous CITR value and the current CITR value, respectively. The coefficient $\alpha$ can be set to 0.7. A link between two beams of the sender and receiver nodes can be represented as:

$$BWF=\min(CITR(c),CITR(x))$$

Here c and x can represent two connected nodes with MBDAs.

Diamond Transmission Potential

In one aspect of the disclosure, another metric can be introduced to measure if a path is capable of diamond transmissions. The metric can additionally find out how many nodes in this path can participate in the diamond transmissions.

Recall that RDC transmission can distribute the data into different beams in each ripple, and all traffic converges at the second ripple. The cycle of a diamond transmission can comprise two ripples (hops). In practice, some nodes in a chosen route may not utilize diamond transmission to forward data in next two ripples due to a lack of available nodes (e.g. for building side paths). Therefore, only a single node may get used to forward data to the next ripple. Such a node (with side paths) can be a bottleneck node, which can drag down the performance of a diamond transmissions due to the use of a single beam. As one of the node quality metrics of diamond transmissions, the number of bottleneck nodes, belonging to node i, can be maintained.

In order to determine if a specific node is capable of launching a diamond transmission in the next two ripples, two factors may need to be considered. First, a node may have to perceive all available routes to the destination node. This routing knowledge can be obtained through a routing discover protocol such as AODV. Second, the nodes may have to possess a neighbor table that can contain information about the accessible two-ripple (two-hop) neighbor nodes and the beam IDs through which it can reach the two-hop neighbors. Moreover, the number of available branches may also be needed because more branches can allow for more side paths.

Here an indicator variable, $D_{ix}$, can be introduced to measure the potential of serving diamond transmission for each node. Suppose node i and node x are a pair of two-ripple neighbors, and node i can forward data to node x via (n+1) different beams. Then $D_{ix}=n$. If node i merely arrives at node x through a single path, $D_{ix}=n=0$, which means that the diamond transmission is not available for this two-ripple diamond unit. Otherwise, the value of $D_{ix}$ can contain the number of branches between node i and node x. This value can be read from the two-ripple neighbor table in each node.

Hence in one aspect of the disclosed systems and methods, a neighbor table can be associated with a node and the neighbor table can contain information about one or more accessible two-hop neighbor nodes from the said node and one or more beam IDs through which the said node can reach the two-hop neighbor nodes.

FL-Based Metric Integration

FL can be used to integrate the above factors together into a single variable that models the node quality dynamics in each node. FL can achieve real-time, low-complexity variable fusion. In particular, Simple Additive Weighting Method (SAW), a widely used FL method, can be used to integrate the above factors.

To further elaborate on the use of SAW, a decision matrix can be defined as shown below, where the first column can represent the node bandwidth factor. The range for the values of this column can be (0,1). If the node bandwidth value approaches 1 it can mean that the node possesses a larger bandwidth.

$$D = \begin{matrix} B_1 \\ B_2 \\ B_3 \\ B_4 \end{matrix} \begin{bmatrix} 0.8 & 237 & 2.3 & 2 \\ 0.5 & 104 & 1.4 & 0 \\ 0.3 & 300 & 0.2 & 1 \\ 0.7 & 400 & 3.8 & 3 \end{bmatrix}$$

The second column denotes the decoding CDF value, which can represent, on average, the total number of symbols that have been sent after the receiver successfully recovers the original packet. The smaller the value of this variable, the better the channel quality of a node. This can be because the receiver may not need many redundant symbols from the sender to recover the original packet.

The third column can represent the antenna capture probability factor. Its range can be [0, 4]. The metric having a value of 4 can represent the worst case, i.e., most likely being captured.

The fourth column can represent the diamond transmission potential factor. A higher value in this column can indicate more extra nodes available to serve as side paths.

The following two formulae can be used to normalize the above matrix. In both (1) and (2), each $x_{ij}$ is the entry of $B_i$ with respect to a specific metric. If the case is "the larger, the better", equation (1) can be applied for normalization. Otherwise, equation (2) can be used.

$$r_{ij} = \frac{x_{ij}}{x_j^{max}} \quad i = 1, \ldots, 4 \; j = 1, \ldots, 4 \tag{1}$$

$$r_{ij} = \frac{x_j^{min}}{x_{ij}} \quad i = 1, \ldots, 4 \; j = 1, \ldots, 4 \tag{2}$$

After applying equation (1) or (2), the normalized matrix can be obtained as:

$$D' = \begin{matrix} B_1 \\ B_2 \\ B_3 \\ B_4 \end{matrix} \begin{bmatrix} 0.8 & 0.42 & 0.1 & 0.5 \\ 0.5 & 0.96 & 0.14 & 0 \\ 0.3 & 0.33 & 1 & 0.25 \\ 0.7 & 0.25 & 0.05 & 0.75 \end{bmatrix}$$

In the following discussion, the settings of SAW weights for the following five types of traffic with various QoS requirements is described: (1) speech and audio streaming—approximately 100 kbps, approximately 10 audio frames per second, up to and including approximately 300 ms delay; this type has the highest priority; (2) interactive video (e.g., video conferencing such as Skype™)—approximately 480p, approximately 10 fps, approximately 512 kbps, up to and including approximately 300 ms delay; this type has the second highest priority; (3) live streaming (e.g., live sports events)—approximately 720p, approximately 30 fps, approximately 2 Mbps, up to and including approximately 2 s delay, this has the third highest priority; (4) video on demand (streaming of pre-encoded video such as Netflix™)—approximately 720p, approximately 2 Mbps, approximately from 5 s to 10 s delay, the fourth highest priority (retransmission of lost packets are not considered); (5) file downloads—approximately 50 MB file in approximately 5 minutes; this can be classified as having the lowest priority, because no packet drops are allowed, as that requires retransmission of lost/dropped packets.

The data flows can have distinct preferences with respect to the setup of the metrics. For instance, HD video data can require large bandwidth and high potential of diamond transmissions, while audio and file data may not have high requirements on those two metrics. However, they may prefer a better channel quality (thus less packet loss) and a less capture probability (again, less loss) on the route. Therefore, different SAW weights can be assigned to the above mentioned four factors for each of the five types of data flows.

The first type of data may not require a high data transmission rate since audio traffic may not have a large amount of data (compared to video). Thus the diamond transmission may not be urgent (i.e. a fewer number of side paths may be acceptable). That is to say that the following vector of weights can represent the situation:

$$W_{audio} = [0.3, 0.3, 0.2, 0.2]$$

The second type of data (interactive video) may need more bandwidth than the first type (audio data), and more side paths can be preferred to deliver more data. Thus the weights can be set up as:

$$W_{video} = [0.7, 0.8, 0.3, 0.5]$$

For the HD live video streaming and HD video on demand, both types of data can require high bandwidth because of the huge video data amount in unit time. More side paths can be needed to deliver these HD video packets to the destination on time. Therefore, the diamond transmission can be important. Thus the weights can be set up as:

$$W_{HDvideo} = [0.9, 0.9, 0.4, 0.8]$$

For the fifth type of data that possesses the lowest priority and the weights can be set up as:

$$W_{data} = [0.2, 0.4, 0.7, 0.1]$$

By multiplying the above weight vector by the normalized matrix D', the Q-value of the data flow can be obtained. The Q-value can then be used in the Q-learning based main path establishment (see next section).

RL-Based Main Path Establishment

In the upcoming sections, the detailed process of using the above node quality metric (a FL-fused value) to seek the best path (main path) based on RL scheme is described. Such a main path can become the 'central pipe' of the proposed RDC routing trajectory (FIG. 2). Before describing RL-based path seeking algorithm, a brief review of how to extend general WMN routing schemes (that aims to search the shortest path) to multi-path routing scheme is provided. Those available multiple paths can be used to search the main path via the RL algorithm.

Multi-path WMN Routing

Dynamic source routing (DSR) can refer to a multi-hop path search protocol that aims to find the shortest path. As mentioned, the shortest path does not necessarily mean that the nodes have the best quality under fast fading channel conditions. Therefore DSR can be extended to a multi-path case in order to obtain the candidate nodes/paths, which will be used to search for the main path.

If a MR in the WMN backbone is asked to issue a routing request (RREQ) message to all its MCs, a general DSR can easily find the hop ID for each node. Those different hop IDs can be referred to as ripples (see FIG. 2). Each MC can belong to certain ripple. In a general DSR scheme, the intermediate nodes can discard the RREQ messages they have received before. Through minor modifications of the route discovery process in DSR, all the available multiple paths between the source and destination can be found. This is because each node can broadcast the received RREQ messages and each RREQ message contains the node IDs that it has traversed. To prevent a count-to-infinity problem, an intermediate node can discard the RREQ messages once their addresses have been determined to already exist in the path list of the RREQ messages. After the routing discovery process, each node receives multiple RREQ messages containing the routing path information (a list of nodes) in the WMN.

After the above multi-path DSR, each node may need to maintain a one-hop neighbor table and a two-hop neighbor table to possess sufficient information for the routing selection. The tables may also need to have the information on which beam (e.g. which direction) the neighbor is located. The previously discussed node quality metric (after applying FL) may also need to be put in the table for each beam (node).

Hence in one aspect of the disclosed systems and methods, a neighbor table can be associated with a node and the neighbor table can contain information about one or more accessible one-hop and one or more two-hop neighbor nodes from the said node and one or more beam IDs through which the said node can reach one or more of the one-hop neighbor nodes and the two-hop neighbor nodes.

After a minor revisions to the DSR protocol, all available candidate paths can be known from a source to a destination. Those paths and their nodes can have various node quality levels. A cumulative method can be used to search the best path (i.e., with the best overall quality for all the nodes of the path). Such a path does not necessarily have the shortest hop count. Such a path can become the main path in the disclosed RDC routing scheme.

Next a RL (Q-learning) based algorithm can be introduced to efficiently find the main path. RL can refer to a cumulative optimization algorithm that considers the overall reward performance after performing node-to-node state/action update.

RL-Based Main Path Establishment

Figure 9:
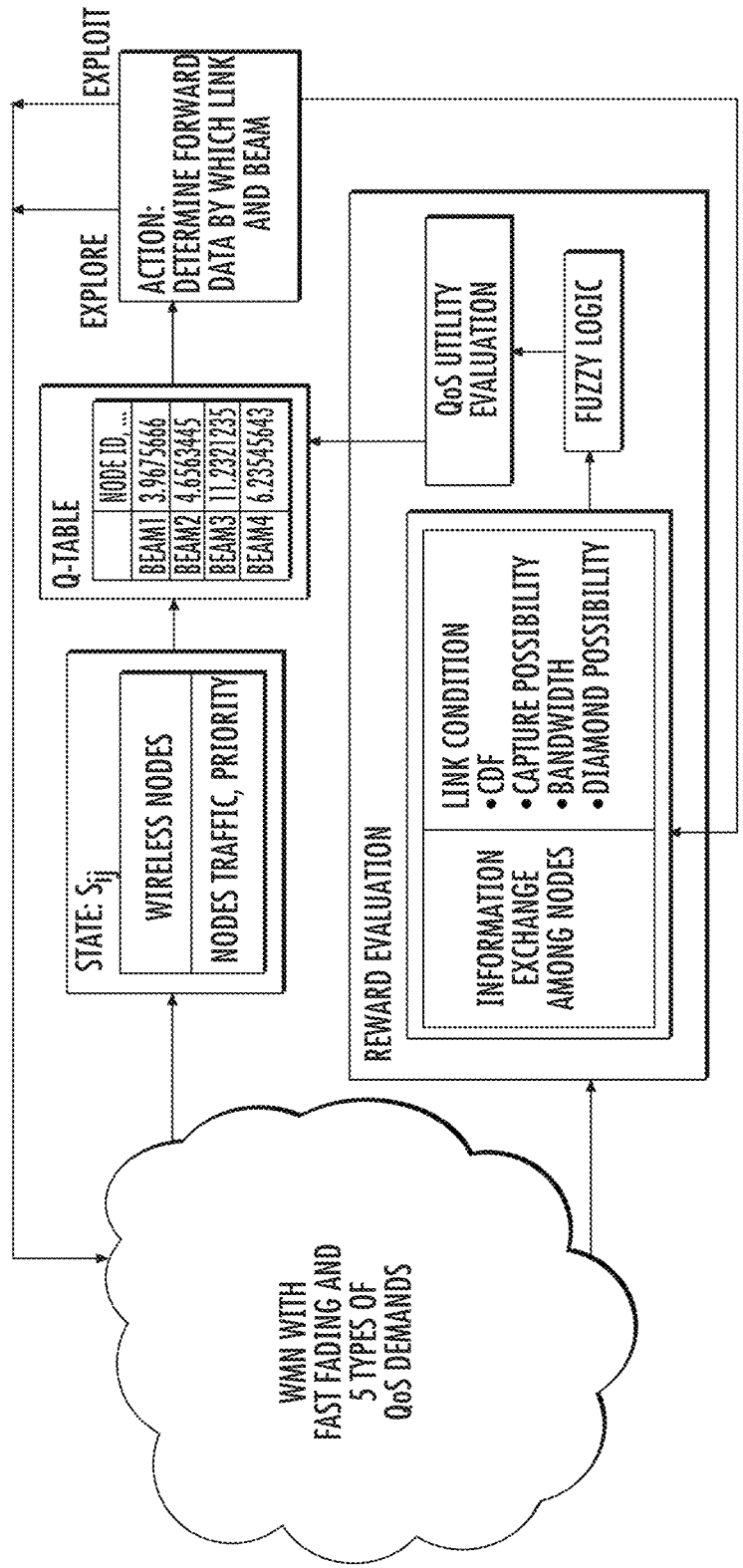
FIG. 9 shows a block diagram that represents the implementation of reinforcement learning for the main path search.

To achieve a real-time main path search, a model-based RL scheme may not be usable due to complex state space search requirements. A model-free RL approach, called Q-learning, uses Q-table to represent the state space and can greatly speed up the path search. The Q-learning process can be realized by modeling the routing selection as a Markov decision process (MDP), in which the best route to the destination node can be found by maximizing the expected rewards of all nodes. FIG. 9 shows how MDP can be applied for WMN main path search.

Briefly, a MDP can comprise 4-tuple (S, A, T, R), in which S represents a finite set of states; A denotes a set of actions; $T=P_{s,s'}(a)$ represents the transition probability from state s to state s' when taking action a in state s; and $R_a(s, s')$ is the reward function received when switching to state s' after applying action a. Normally, a MDP problem can be solved through five iterations: 1) An agent (node) becomes aware of the entire MDP environment (WMN network conditions) and which state it is in. 2) Based on the current state, the agent adopts an available action a∈A. 3) In the next phase, the agent transfers to the next state s' and obtains a reward value from the system. 4) The agent updates the path searching policy based on the reward it just received. 5) These steps can be repeated at the current state.

To adapt to the dynamic channel conditions as well as the decentralized WMN architecture, Q-learning can be adopted to efficiently find the optimal routing path (i.e., main path). Q-learning has the following five elements: (1) States: The state of a node can include various parameters in each beam (node) such as its throughput, packet drop rate, bit error rate (BER), and the like. (2) Actions: The set of the candidate actions $a_t \in A_t$ at each state $S_t$ can denote the available transmissions to the one-hop neighbors of the node. Such an action can point out which beam to use, and which neighbor to communicate next. (3) Rewards: The reward can refer to the FL-based integration of the node quality metrics discussed. (4) State transition: The state transition matrix $T=P_{s,s'}(a)$ can refer to a fixed matrix, and each state transition probability can be determined beforehand based on historical empirical data. (5) Online learning: the Bellman equation (discussion next) can be used to perform online policy search based on the cumulative rewards.

The Bellman optimality equation can refer to a mathematical optimization method to optimize the Markov decisions based on the long-term reward calculation. In one aspect of the disclosure, it can be used as a utility function:

$$V^*(s) = \max_{a \in A} E_\pi * \left\{ \sum_{k=0}^{\infty} \gamma^k r_{t+k+1} \mid s_t = s, a_t = a \right\}$$

Here $0 < \gamma < 1$ can refer to a discount factor that confines the impact from the long-term decisions. When $\gamma=0$, the node can make the decision in a myopic manner, e.g., without considering long-term optimization. In this case the node can forward the data to the next node that can generate the maximum immediate reward in the current hop while not considering the total cumulative reward. On the other hand, when $\gamma$ approaches 1, the agent can emphasize future reward, in which the RL system can be more farsighted. In the above equation, $r_t$, $s_t$ and $a_t$ denote reward, state and action, respectively. $V^*(s)$ can refer to the utility value for taking action $a=a_t$ at state $s=s_t$, and then executing the optimal policy $\pi^*$ thereafter.

The Bellman optimality equation can be denoted as action-value equation $Q^*(s, a)$:

$$Q^*(s_t, a_t) = E\{r_{t+1} + \gamma V^*(s') \mid s_t = s, a_t = a\}$$
$$= E\left\{r_{t+1} + \gamma \max_{a' \in A} Q^*(s', a') \mid s_t = s, a_t = a\right\}$$
$$= E(r_{t+1}) + \gamma \sum_{s'} P_{s,s'}(a) \max_{a' \in A} Q^*(s', a')$$

The model-free Q-learning can be used to optimize the main path selection by iteratively updating the Q-values for given nodes between nodes:

$$Q(s, a) = (1 - \alpha)Q(s, a) + \alpha \left\{ r_{t+1} + \gamma \max_{a' \in A} Q(s', a') \right\}$$

Besides states, action a and discount factor $\gamma$ explained previously, two other parameters used in Q-learning can comprise: (1) a: The learning rate, which can be set between 0 and 1. Setting the learning rate a to 0 can mean that the Q-values are never updated, hence nothing is learned. Setting to a high value such as 0.9, can mean that the learning can occur quickly. (2) $max_a$: The maximum reward that is attainable in the state following the current state, i.e., the reward for taking the optimal action thereafter.

After the parameters of the above formula are determined, Q-learning can be able to learn the optimal routing policy by iteratively updating the Q-value as the following algorithm:

---

Initialize Q(s, a), s∈S(all nodes in a WMN), a∈A (One-hop neighbors of current node),
Repeat (for each episode):
    Initialize S
    Repeat (for each step of episode):
        According to the routing list and the destination of the packet
        Choose a one-hop neighbor as a relay node and forward data as an action a
        Take action A, observe reward r and next state s'
            $Q(s_t, a_t) \leftarrow Q(s_t, a_t) + \alpha[r_{t+1} + \gamma \max Q(s_{t+1}, a) - Q(s_t, a_t)]$
            s ← s'
    until S is terminal

---

At the beginning, every node of a WMN can maintain a Q-table. Once a node is about to send out a packet, it may have multiple candidate one-hop neighbors according to the available routes found during the DSR-based multi-path routing discover process. The node can send the packet to one of these candidates as an action a. After the packet is sent to the next node, the reward r can be collected and piggybacked by the ACK message, and the node can update the Q-value in the Q-table with the reward r. Then, the next node holding the packet can become the current node of Q-learning. This process can be repeated until the packet arrives at the final destination.

RDC-Shaped Routing

After the main path is established via the above RL scheme, the side paths can be added to it. This can allow for the formation of the diamond chain topology. In the upcoming sections, the RDC routing architecture is described as well as the ripple schedule control scheme.

Diamond Chain

Candidate paths can be found between a source and a destination through the use of multi-path DSR. Moreover a node can maintain its 1-hop and 2-hop neighbor table for side path establishment purposes. As shown in FIG. 10, after the main path (1001) is formed, side paths can be added (1002) around the main path by selecting the neighbors that belong to the same ripple (i.e., the same hop ID) as the next-hop relay nodes.

FIG. 11A shows the basic idea of side path generation. Suppose the main path has been decided, where S, F, and C are the main path nodes. Through the DSR protocol's RREQ propagation, it can be known that B, E, and G are in the same ripple as F. Here S can maintain those nodes' profiles (such as their ripple IDs, beam directions, link quality to that node, and the like) in its 1-hop and 2-hop neighbor tables. Suppose node S chooses nodes B and E as the relaying nodes of the side paths. As a result, node S distributes data (rateless coded symbols) to nodes B, F and E in three different beams in the same superframe time duration. During the next superframe time duration, nodes B, F and E can forward packets to node C. This process can be repeated every two ripples (hops). They thus form a diamond chain routing architecture. Each node in the main path can serve as either the source of the divergence nodes (such as node S) or the destination of the convergence nodes (such as node C).

Because of the rateless codes in the diamond chain, the packet pieces (called symbols) can go through the main path and side paths. Based on the 1-hop neighbor table, the node quality in each beam can be known. While the majority of symbols may need to be allocated to the main path direction (i.e. S→F), a certain number of symbols can be assigned that are proportional to the node quality in each side path node (for example, S→B and S→E). The node quality can be an integrated FL-based metric.

During the above diamond chain formation, some particular issues may need to be considered. One of them is the path collision problem. As shown in FIG. 11B, suppose that the main path is known, that S is the divergence node, and that D is the convergence node. S may need to find side paths among its 1-hop neighbors. Suppose S establishes two side paths to B and C. Here S sends data to both B and C. In the next phase (superframe time) both B and C are supposed to send data to D.

If B and C are in the same beam coverage of the convergence node D, path collision issues can arise. This is because D may not be able to simultaneously talk with two (or more) nodes in the same beam. To avoid this issue, any two main path nodes that are two hops away (here it is S and D) can be asked to exchange their 1-hop neighbor tables. In such a table, the main path node can be aware of the beam ID of each neighbor. Here the main path node D can use conventional multi-beam antenna direction of arrival (DOA) detection schemes to find out that B and C are located in the same beam ID. By exchanging its neighbor table with S, S can avoid the selection of both B and C as side path relays (and instead only select one of them).

Figure 12:
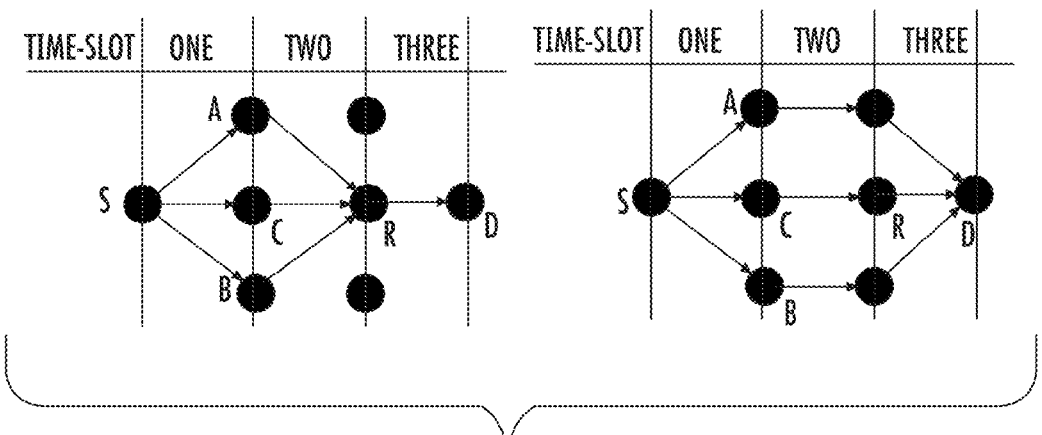
FIG. 12 shows different situations of RDC routing, including an example bottleneck link R-D (left); and an exemplary method to overcome the bottleneck node (right) in accordance with the disclosed systems and methods.

Each diamond "chain" of RDC route can comprise nodes in a 2-hop range, including the first hop for data divergence and the second hop for data convergence. However, a bottleneck node can exist when the number of hops from the sender to receiver is an odd number, as shown in FIG. 12 (left part). Since node R can receive more data than what it sends out at any given time, a bottleneck of the data flow pipeline can be generated, which can be the node R→D.

If there are multiple nodes available to the destination node, one solution can be to simply use disjoint paths in the last 3 hops, as shown in FIG. 12 (right). After the data diverges in the first hop, the relay nodes may choose not to converge. Here S chooses A and B as relay nodes of the side paths as usual. A and B may know that D is two hops away. They can try to find other relay nodes (instead of R) in order to make the data converge to D. Through 1-hop and 2-hop neighbor tables, they can easily find the proper relay nodes to achieve disjoint path transmissions.

Another solution can be to change the allocation of ripple-to-ripple airtime (e.g., the packet transmission duration). For example, as shown in FIG. 12 (left), while A and B send the data to R during one time interval, R can be allocated a longer time interval after it gets the "token" to forward the data to the next ripple, as will be discussed in later sections.

Figure 13:
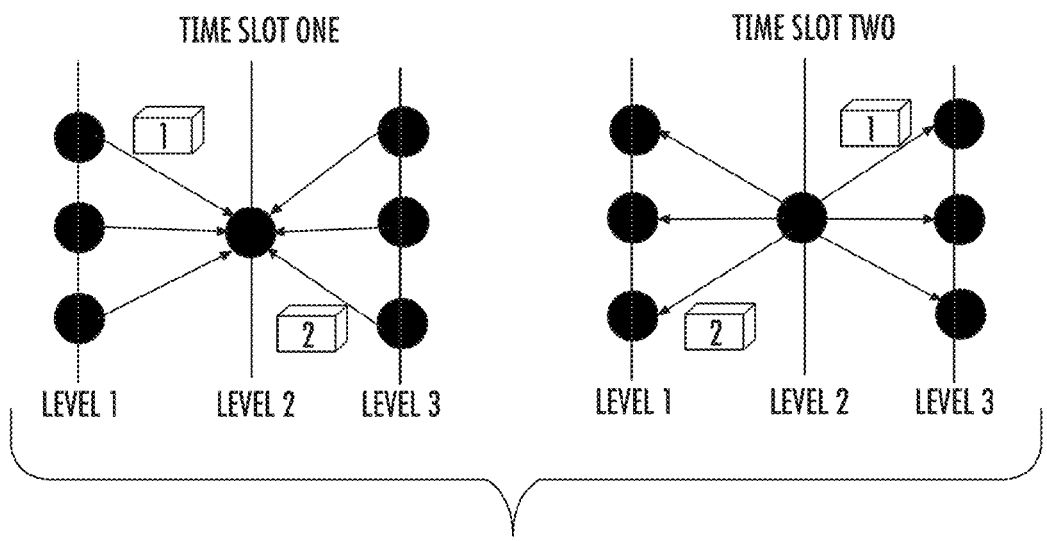
FIG. 13 shows schematics of an example byproduct of RDC routing, namely, bi-directional streaming.

Bi-Directional Transmissions:

Besides throughput improvement, the utilization of MBDAs and RDC routing can also enable bi-directional streaming. Due to the synchronized multi-beam transmission nature of MBDAs, the packet delivery in the time slots can be bi-directional. As shown in FIG. 13 (left), packet 1 can be forwarded to the main path node, while in the meantime, packet 2 can be delivered to the same main path node. Thus the data can be transmitted in both directions at the same time. FIG. 13 (right) shows the traffic divergence case. This can not only enable some particular applications such as interactive video calls (e.g., where both the sender and receiver need to send video/audio traffic to each other), but can also provide a solution for sending back ACK messages without occupying extra time slots. This can be because any node can buffer the ACK for a short time and then quickly piggyback it to the main path node via the concurrent multi-beam communication.

Below is shown an exemplary process of RDC-based routing scheme:

---
Exemplary RDC-based Routing Algorithm
---
Input: Unique ID of the node "i", current time slot "t"
Output: Chosen star node and Tx/Rx mode of the node
/* chose the star node I, select mode and launch ripple process if necessary*/
  1) for (k∈Maximum number of nodes in WMN)
  2)    node i = hash(k⊕t);
  3)    If (node I possesses high priority data flow to forward)
  4)      Transmission mode of node i = Tx
  5)      If (node a ripple is necessary)
  6)        Node i launches ripple and forwards "tokens"
  7)    Else
  8)      Transmission mode of node i = Rx
/* Ripple processing*/
  9) Get the basic information of the data flow from application layer
 10) If (diamond transmission is required)
 11)    Check how many paths are required
 12)    Find the best path from available paths
 13)    Determine the length of the time slot
 14)    Send out the "tokens" to decided beams and broadcast SCH frames to the other neighbors
 15)    According to these control frames, related nodes start forward data
 16) Else
 17)    Proceed the regular two-layer MAC protocol
 18)

In Each Ripple: Multi-Beam MAC

In each ripple the localized, 1-hop neighborhood communications require further attention. Although typically controlled by MAC protocols, a transmission control strategy may be required since conventional IEEE 802.11 protocols may not be applicable to multi-beam antennas. For completeness, an MBDA-oriented MAC scheme is described here. Note that all nodes in each ripple can either all be in receiving or in sending status due to the properties of MBDAs and the disclosed RDC routing scheme. A single round of sending or receiving time duration in a particular ripple can be defined as a superframe.

Figure 14:
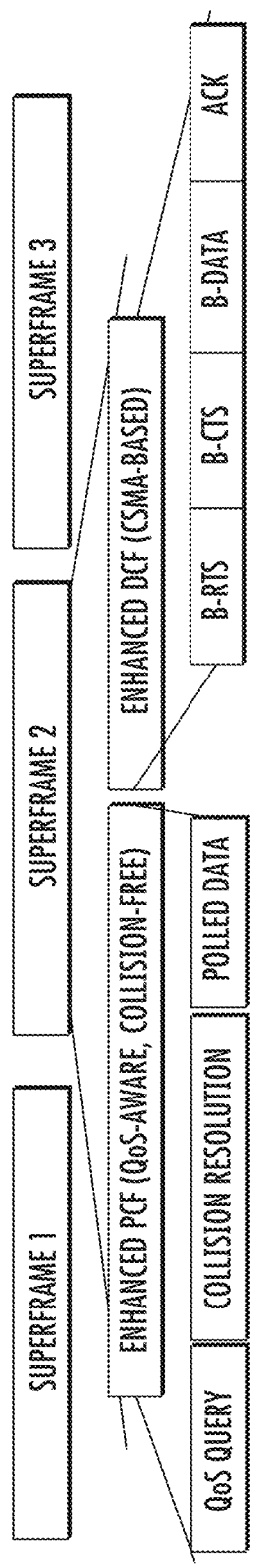
FIG. 14 shows a diagram representation of the multi-beam media access control (MAC) frame architecture.

As shown in FIG. 14, an enhanced point coordination function (PCF) and an enhanced distributed coordination function (DCF) can be used in each Superframe to adapt to the multi-beam QoS-aware communication requirements. General PCF and DCF have been defined in the IEEE 802.11 standards.

Enhanced PCF Operations

The node in the main path can serve as a point coordinator (PC) in PCF mode. Each PCF operation can include 3 phases (FIG. 14). The PC can use QoS query phase to ask each node (in side paths) in the next ripple to feedback its flow QoS parameters. The collision resolution phase can then be used to solve the collisions during QoS response phase since each beam of the node may have multiple nodes sending back QoS responses. The polled data phase can be used for official data transmission from the PC to each node of each beam.

Enhanced DCF Operations

Figure 15:
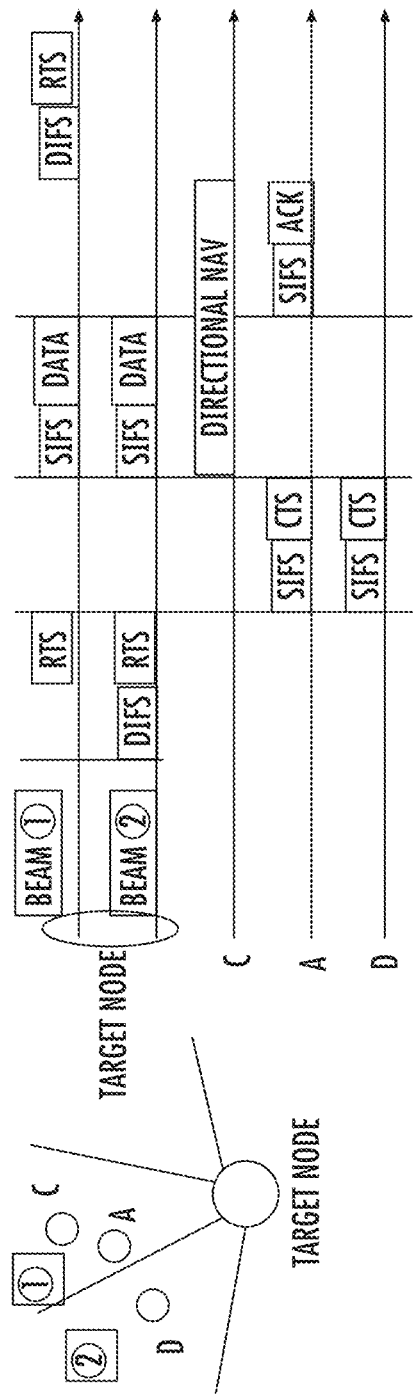
FIG. 15 shows a diagram of an example of the enhanced distributed coordination function (DCF) phase in accordance with the disclosed systems and methods.

FIG. 15 shows an example of multi-beam DCF operations. Note that C and A are in the same beam. The node (in the main path) can only talk with one of them (based on the traffic priority; for example, VBR has higher priority than ABR). Here the node can use (RTS-CTS-DATA-ACK) to communicate with A first. C may need to wait for a directional network allocation vector (DNAV) based on the time specified in A's CTS. The enhancement of conventional DCF can thus be that the backoff timer is adjusted to guarantee concurrent multi-beam transmissions because this can be a requirement for MBDAs. Specifically, random back off-time after each DIFS may not be used as in conventional IEEE 802.11 DCF protocols. Instead, CW-based backoff can be removed after DCF Interframe Space (DIFS) for beam synchronized communications. But each node can be required to wait for the CW-based random backoff before (not after) the DIFS duration. Moreover the beams can wait for the same time durations if not receiving CTS.

Each main path node, regardless of whether the node is the sender of divergence paths or the receiver of the convergence paths, can maintain a table, called the DCF Beam Table (see Table 1, below), and can update such a table after sending RTS in any beam. The main path node may need to know what nodes are actively communicating with itself in each beam.

TABLE 1

DCF Beam Table

| Beam ID | Active nodes | Traffic type | Airtime | bi-directional data | Antenna capture probability | Rateless CDF factor |
|---|---|---|---|---|---|---|
| 1 | D | CBR | 2 ms | ACKs | 0.7 | 101 μs |
| 2 | A | VBR | 2.3 ms | Reverse video flow | 0.2 | 60 μs |
| 2 | C | ABR | 1 ms | No reverse data | 0.8 | 91 μs |
| ... | ... | ... | ... | ... | ... | ... |

Ripple Schedule Control

Figure 16:
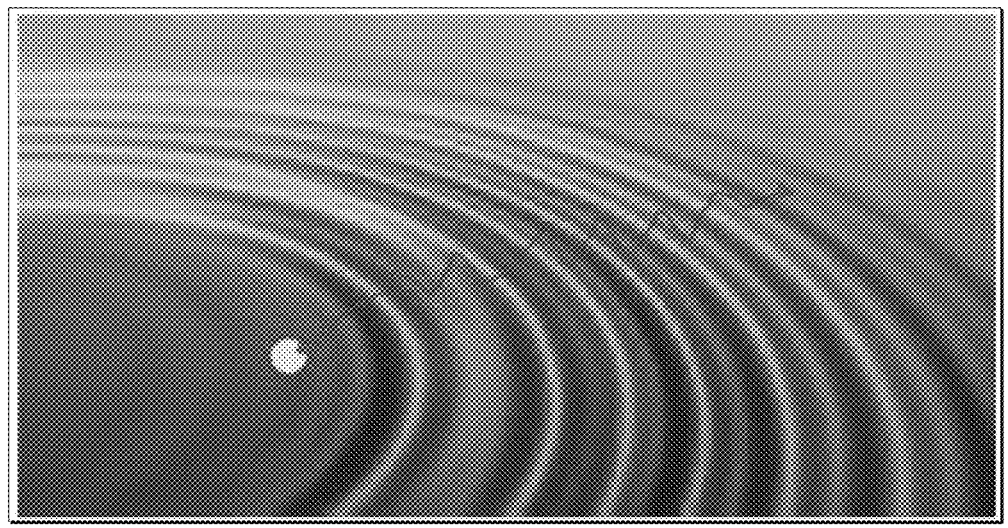
FIG. 16 shows an illustration of the ripple-to-ripple propagation pattern in accordance with the disclosed systems and methods.

From the above discussions, it can be apparent that each ripple can be in either diffusion (sending) or aggregation (receiving) status. There can be a need to control ripple-to-ripple data propagation since two neighboring ripples may not both be in the same status. Inspired by real water ripple propagation patterns (with alternate crests and troughs, see FIG. 16), the disclosed ripple transmission schedule control scheme can thus be described. Since local communication behaviors are considered, the enhancement of the general MAC scheme is discussed.

Figure 17:
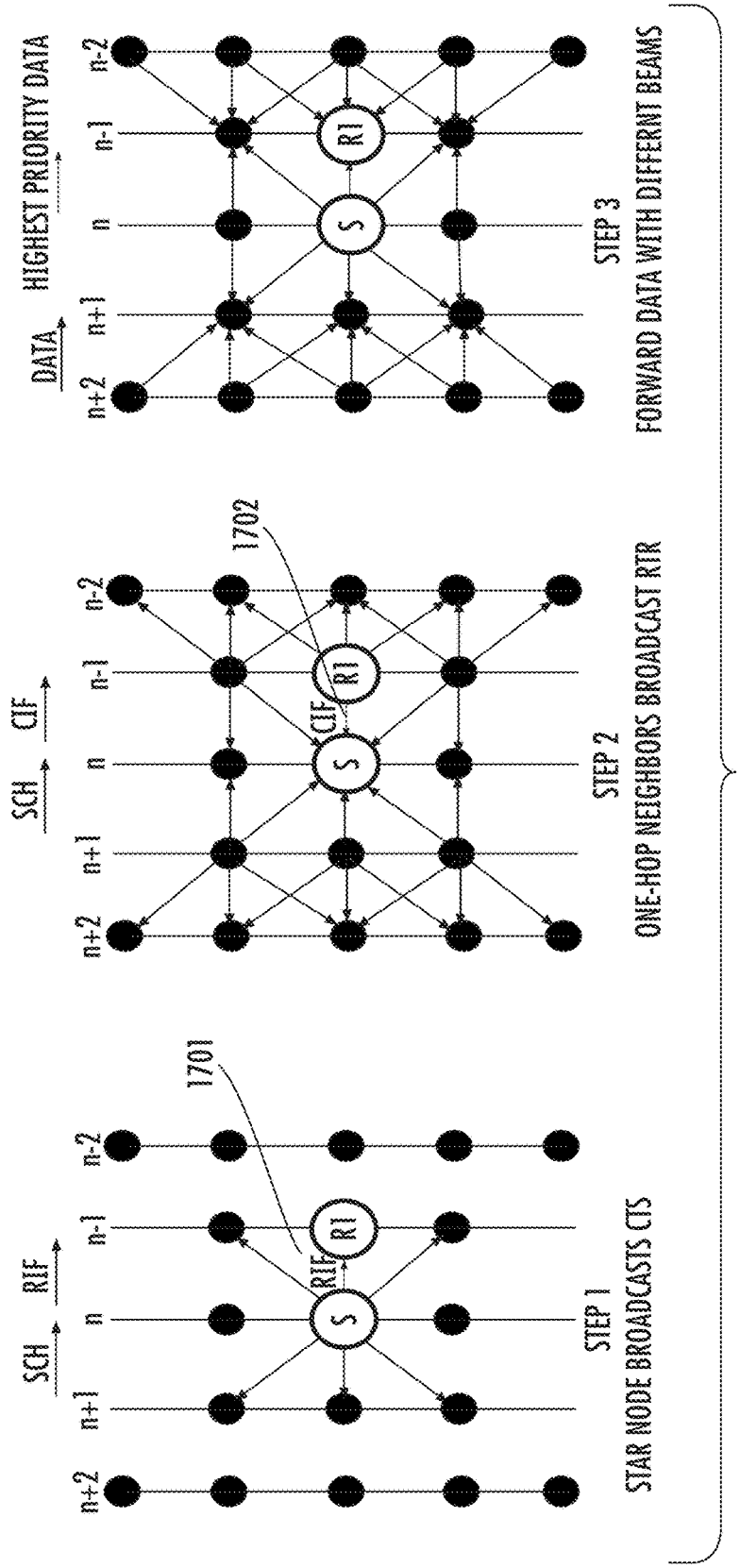
FIG. 17 shows diagram representations of the three basic steps of ripple schedule control in accordance with the disclosed systems and methods.

The ripple schedule control can be regarded as a token-passing process. For example, as shown in FIG. 17, node S can start a transmission of a particular data flow. The first step of node S can be the forwarding of a token to the next hop in the path of the data flow. In this case, the next hop is node R1, as shown in step 1 of FIG. 17. This token can be the message RIF, which is shown as arrow 1701 in the Figure. However, since the nodes can be equipped with MBDAs, it may be desirable to use other beams of node S to forward data while node S is sending data to node R1. When node S is sending RIF message to R1, it can also send an SCH message to its other one-hop neighbor nodes. The SCH message is not a token message. Rather, it can work like an RTS message, which can be used to ask neighbor nodes if they are available to receive data from node S.

In the step 2 of FIG. 17, the one-hop neighbor nodes of node S can provide feedback to node S. In particular node R1 can send a CIF message to node S because node R1 previously received a token message from node S in step 1. For the other one-hop neighbor nodes, the nodes can provide a SCH message to signal to node S that the nodes are available to receive data from node S. At the same time (in step 2), these one-hop neighbors of the node S can also use the other beams to broadcast the SCH message to their one-hop neighbors (nodes at the n+2 level and the n−2 level). This SCH messages signals to the nodes at the n−2 level and the n+2 level that the nodes at the n−1 level and level n+1 are about to receive data.

In step 3, node S can forward the data (with the highest priority) to node R1. Meanwhile, node S can use the other beams to forward data to other one-hop neighbor nodes of itself. Similarly, when the one-hop neighbor nodes of the node S are using one beam to receive data from node S, they can also use their other beams to receive data from other nodes.

Figure 18:
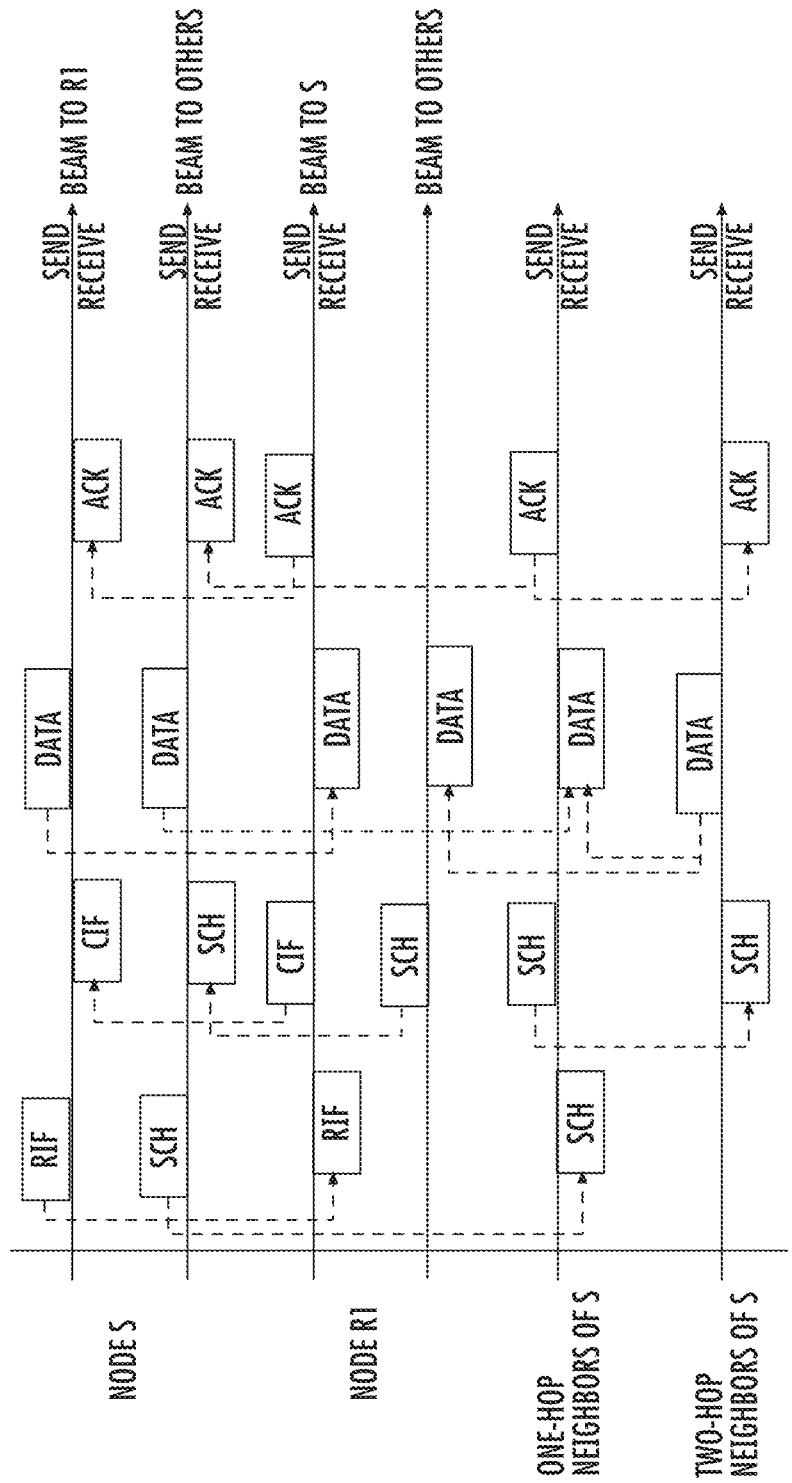
FIG. 18 shows a diagram of the timelines associated with the ripple schedule control scheme.

FIG. 18 illustrates the same process of the FIG. 17, but serves to describe the timing aspects of the process. Every horizontal line can stand for one beam or multiple beams of a node. The blocks above this line can demonstrate messages sent out from a given beam, while the messages below this horizontal line represent messages received by the said beam. For example, the top horizontal line can stand for a beam of node S. This beam can be used to reach node R1 as labeled. The RIF block above the horizontal line can signify that node S is sending a RIF message to node R1 by this beam. By tracking the dashed arrow from the RIF message, it can be seem that the RIF message can be received by a beam of node R1, as represented by the third horizontal line from the top. Since node R1 is receiving the RIF message by this beam, the RIF block can be represented underneath this third horizontal line.

In other words, FIG. 18 shows that before the data transmission, the MAC layer can decide the length of the superframe (FIG. 14) via the amount of data information contained in SCH and RIF frames. That is to say, the time length of the superframe can be determined by the node that holds the token in the data flow. As an example, suppose S intends to forward n bytes to R1 in this superframe. S can calculate the airtime for forwarding these n bytes data. Then it can send this information to all its neighbors through SCH and CIF frames. Furthermore, those frames may carry QoS information for the five types of data.

Besides traditional IEEE 802.11 control messages (DATA, NULL, RTS, CTS and ACK), another two new messages can be introduced. These two new messages can be called RTS with Intelligent Feedback (RIF) and CTS with Intelligent Feedback (CIF). They can be employed as "tokens" in the ripple protocol. Moreover, another control frame SCH can also be introduced to arrange beam transmissions other than the ones negotiated via RIF/CIF.

Performance Analysis

The performance of the disclosed RDC-based multi-beam routing protocols is evaluated in this section, including the multi-beam ripple-to-ripple MAC protocol, diamond transmission, and the RL-based paths selection. In the simulations, every node in the WMN is assumed to be equipped with MBDAs with 6 beams for data receiving and forwarding. Each beam has approximately 2.5 Mbps of capacity. Thus 6 beams gives a total of approximately 15 Mbps maximum node capacity. Each beam covers an approximately 55 degree angle, and there can be approximately 10 degrees of gap between any two neighboring beams.

Figure 19:
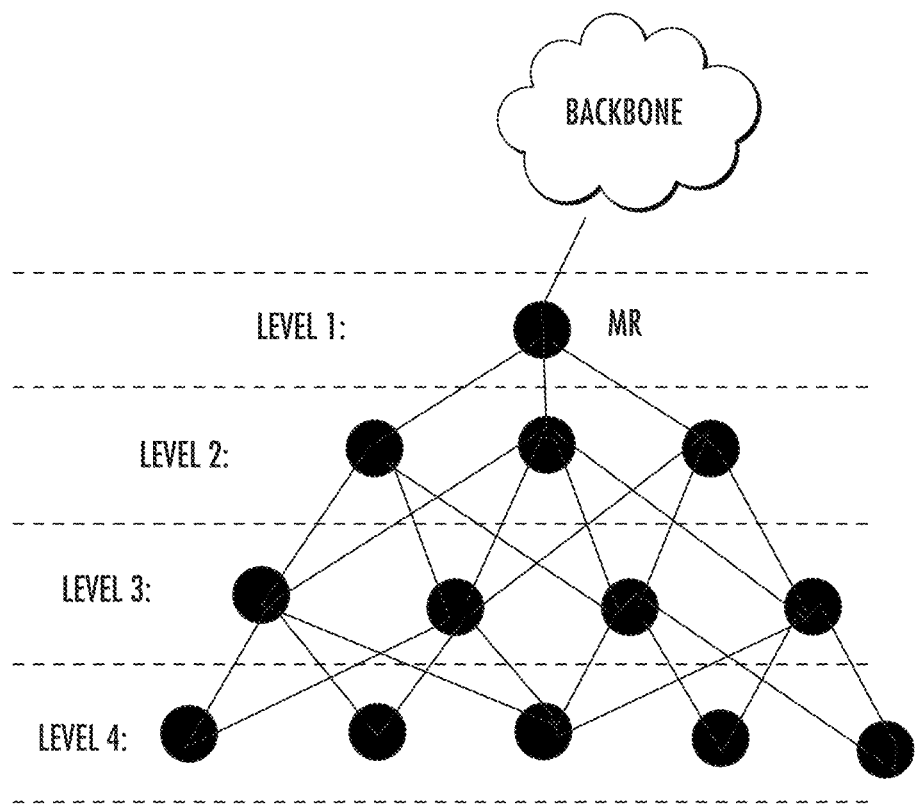
FIG. 19 shows a diagram of the WMN simulation topology.

The disclosed WMN simulation topology is shown in FIG. 19. A node can act as a MR connecting to the wireless backbone, when the others can be MCs. They can form a tree topology with the MR as the tree root. The tree levels can be like ripples since all nodes in the same ripple can have the same number of hops to the MR. In the following experiments, the time slot duration of approximately 10 ms can be used, as recommended, for example, by the IEEE 802.22 standard.

Ripple-to-Ripple Transmission Performance

As discussed, the disclosed RDC routing can consist of a series of localized diamond chain transmissions. In each ripple a multi-beam MAC protocol with enhanced PCF and DCF modes can be employed. Such localized transmission control can be important since the whole routing path consists of those pipelined diamond chain transmissions. The communication performance can thus be evaluated in each ripple first, e.g. the packet loss rate, delay, and throughput metrics.

A comparison of three types of localized transmission protocols in each ripple can be performed. (1) MB-PCF+DCF: the disclosed proposed multi-beam MAC with enhanced PCF and DCF method; (2) MB-DCF: multi-beam MAC without enhanced PCF (DCF only); and (3) OM-802.11: conventional IEEE 802.11 protocol (use omni-directional antennas; without multi-beam enhancement) in each ripple.

Figure 20A:
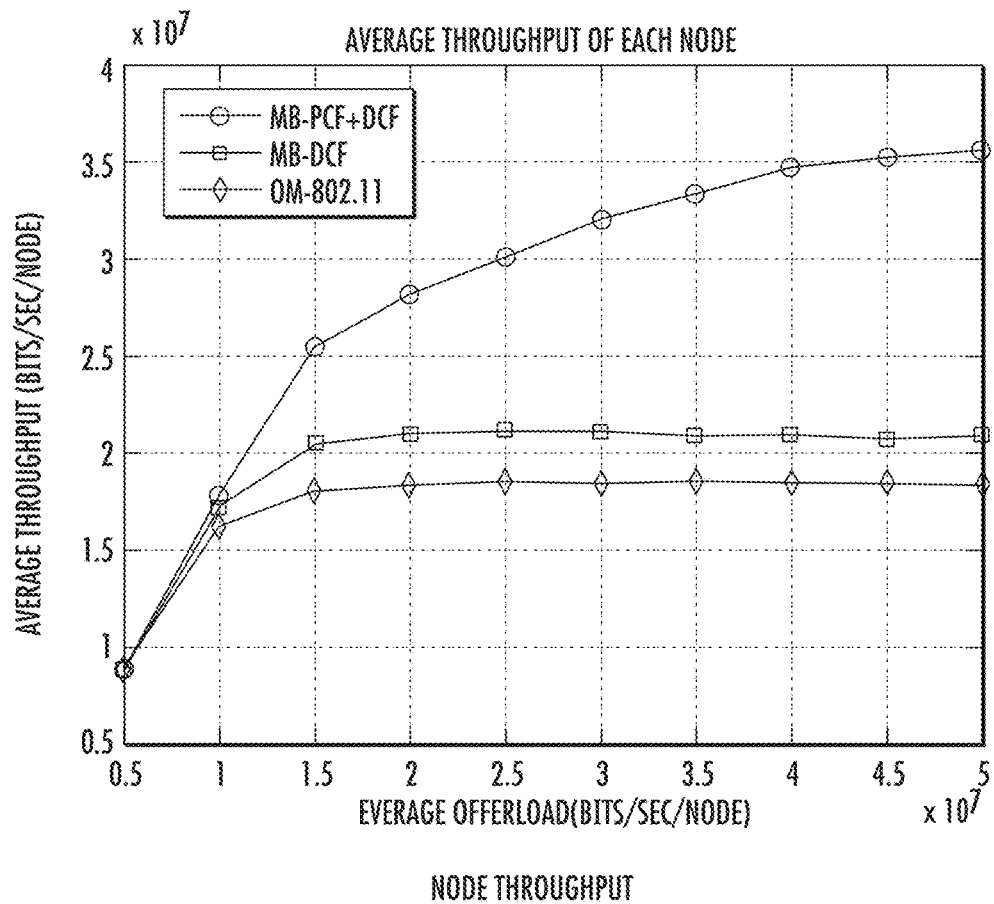
FIGS. 20A-20C show plots of performance comparisons between the disclosed multi-beam systems and methods with the use of enhanced point distribution functions (PCF) and DCF, without the use of PCF enhancement, and with the use of conventional IEEE 802.11 protocols when comparing average throughput (FIG. 20A), average loss rate (FIG. 20B), and average delay (FIG. 20C)
Figure 20B:
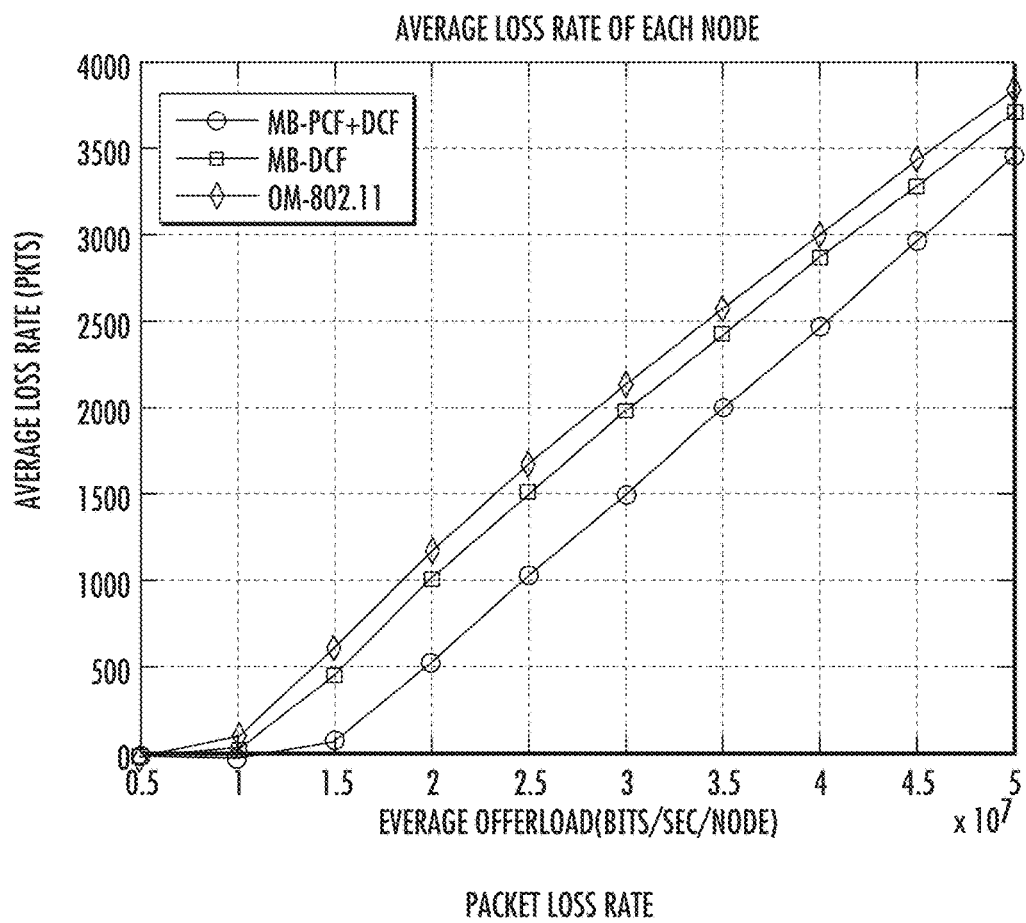
Figure 20C:
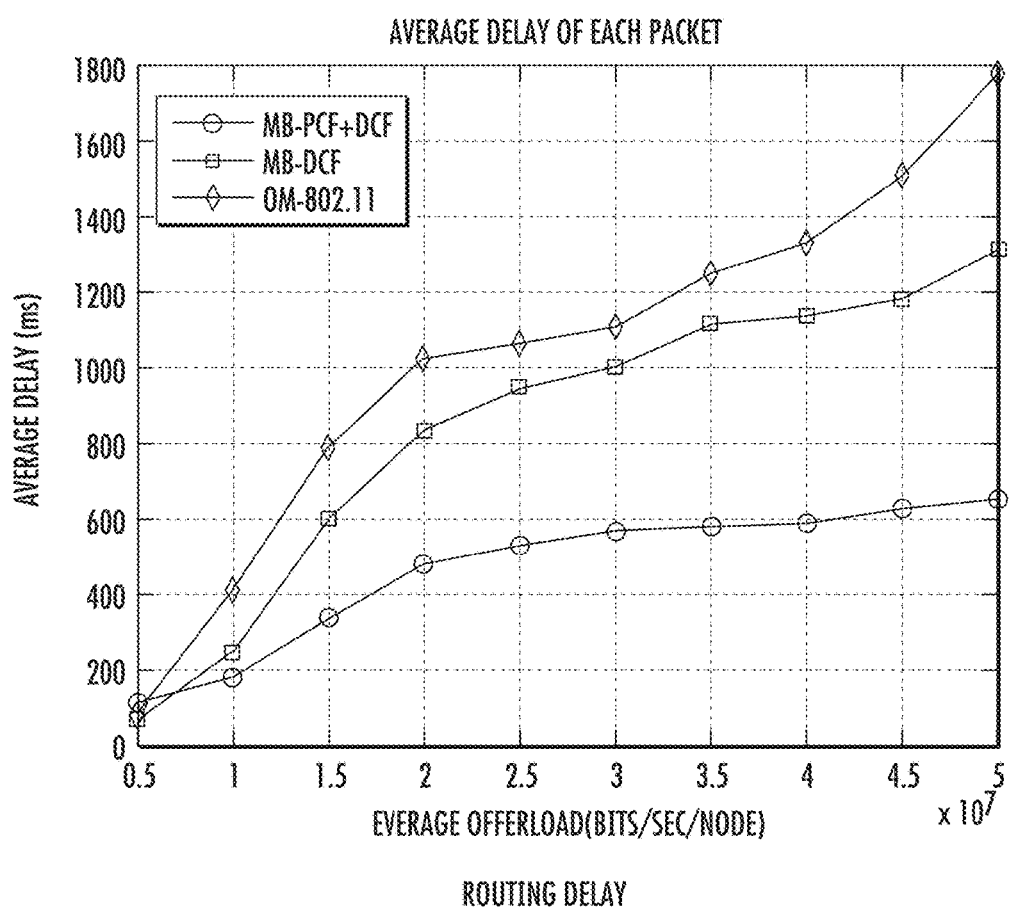

In FIG. 20A, the x-axis represents the average data generation rate of each node. The y-axis stands for the average throughput of each node in the WMN. The disclosed multi-beam MAC has a higher throughput than other two schemes. The conventional IEEE 802.11 protocol has the lowest throughput. This can be mainly because that IEEE 802.11 protocols were designed for a wireless network with omni-directional antennas. Thus it may not be suitable to WMNs with MBDAs. FIG. 20B shows that the disclosed scheme has the lowest packet loss rate. This can be because the multi-beam nodes can select the proper number of symbols to send based on the node quality in each beam. A higher quality beam can transmit more symbols. Thus the packet drop events can be reduced by pushing more data to better beams. FIG. 20C shows the delay performance. Again, the disclosed scheme has the lowest ripple transmission delay due to the multi-beam concurrent communication capability.

Figure 21A:
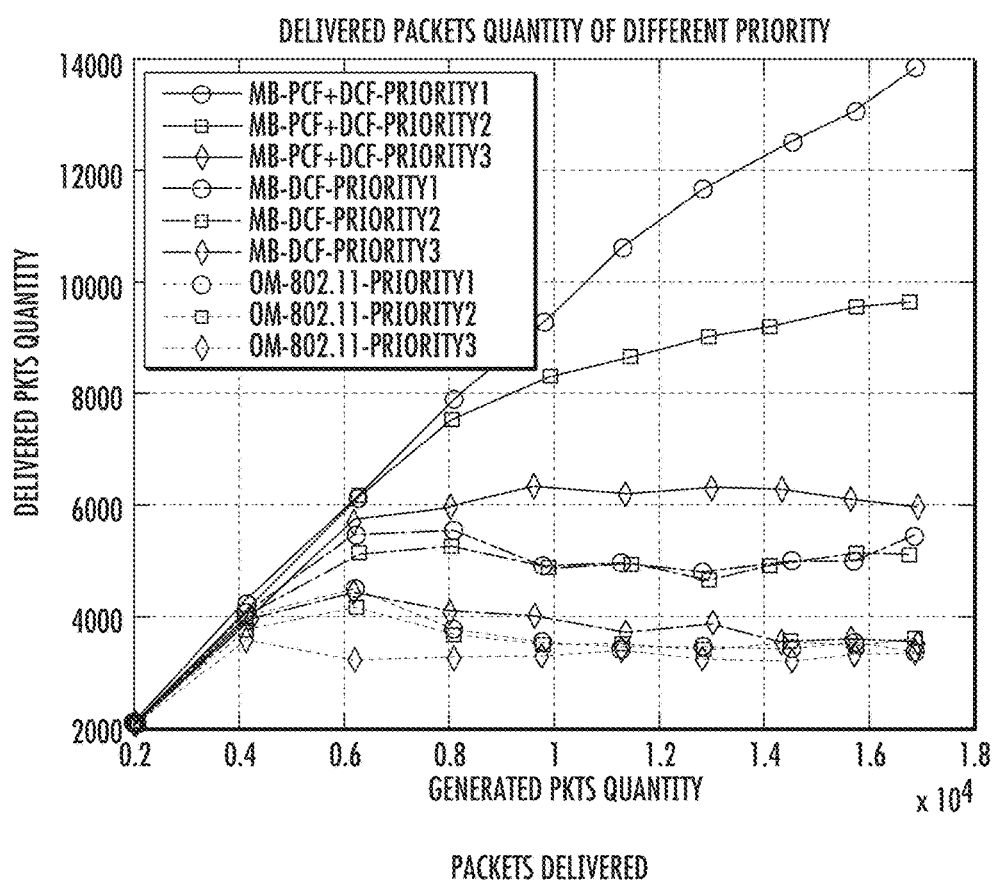
FIGS. 21A-21C show plots of data relating to the quality-of-service (QoS) performance in connection with the disclosed systems and methods where FIG. 21A compares delivered packets quantity, FIG. 21B compares delay, and FIG. 21C compares loss packets quantity.

QoS performance: In this set of experiments, the localized ripple communication performance in terms of data flows with different QoS priorities can be evaluated. Here the three flow priorities comprise video data. The packet size can be approximately 1500 bytes. However, the three flow priorities can have different QoS requirements. Priority #1 can only tolerate a maximum of approximately 200 ms of end-to-end delay; Priority #2 can tolerate up to approximately 300 ms; Priority #3 can tolerate up to 550 ms. FIG. 21A can illustrate the performance of delivering packets with different priorities.

Figure 21B:
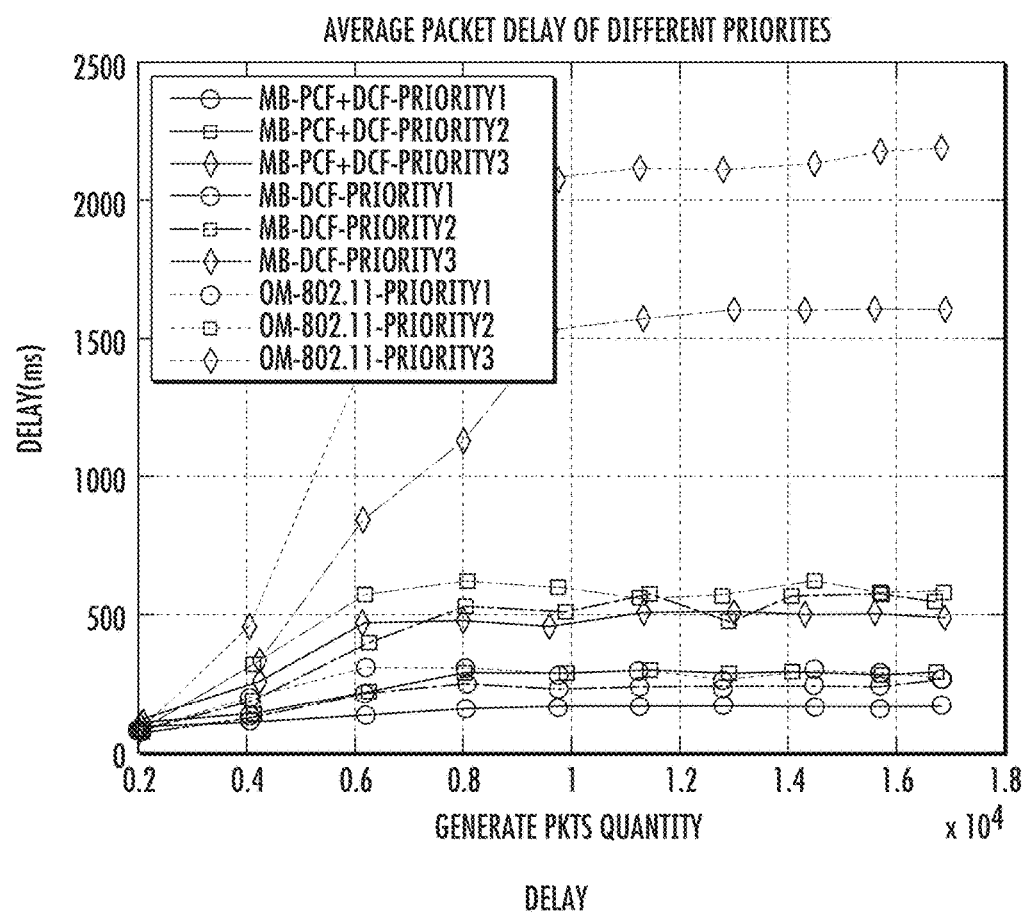
Figure 21C:
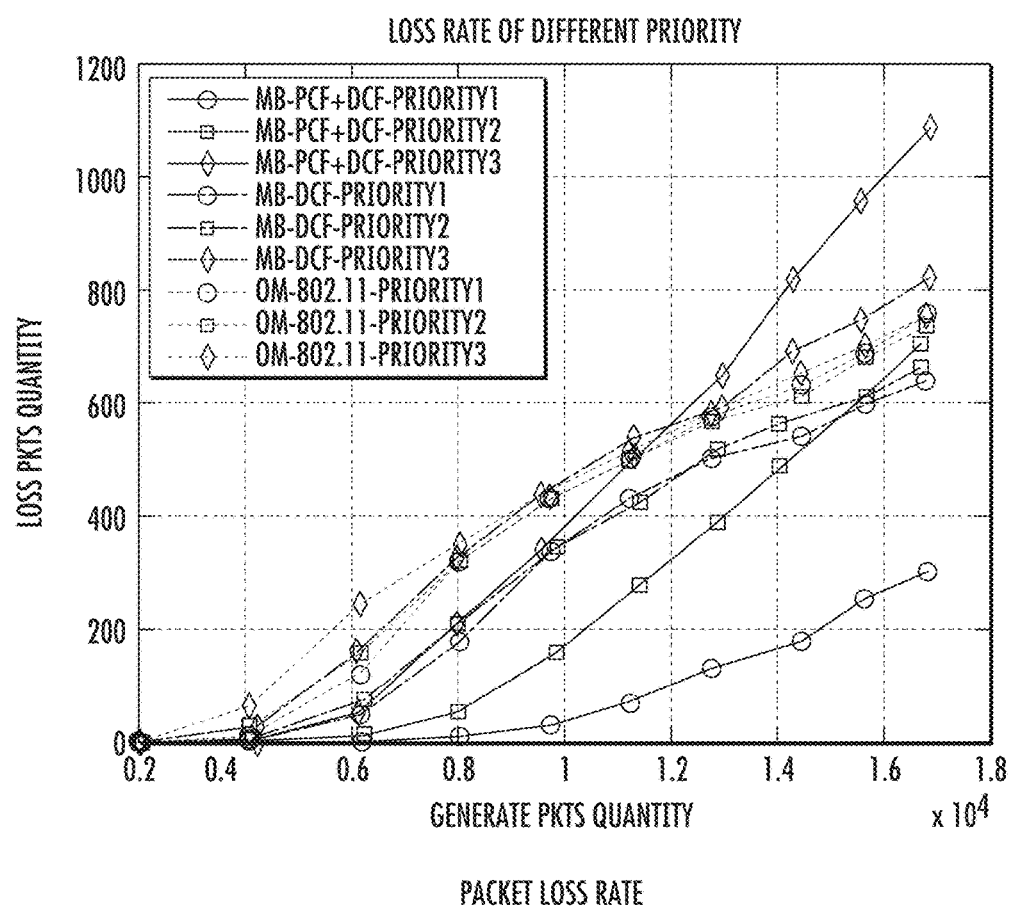

Thus the disclosed protocol delivers more packets than other two protocols. Furthermore, while the traffic load is increasing, the disclosed protocol can still guarantees that the data flow with higher priority has better performance. FIG. 21B and FIG. 21C also give similar results in terms of delay and loss rate. Circles are used to mark out the results from the disclosed scheme.

Diamond Transmission Performance

After evaluating the localized, single-ripple, multi-beam communications, the entire diamond chain based routing performance is described. The disclosed RDC-based scheme can be compared with a PCF scheme and a ripple scheme. The PCF scheme can refer to the conventional DSR routing scheme (no diamond chain formation) based on the original IEEE 802.11 PCF mode. Thus it does not have enhanced PCF with multi-beam transmissions in each ripple. The ripple scheme can refer to the use of multi-beam transmission control in each ripple. However, it does not form the diamond chain in the whole routing path. Instead, it randomly picks up multiple, disjoint paths to deliver the data (via revised, multi-path DSR routing). Thus it has less nodes using multi-beam capabilities.

Figure 22A:
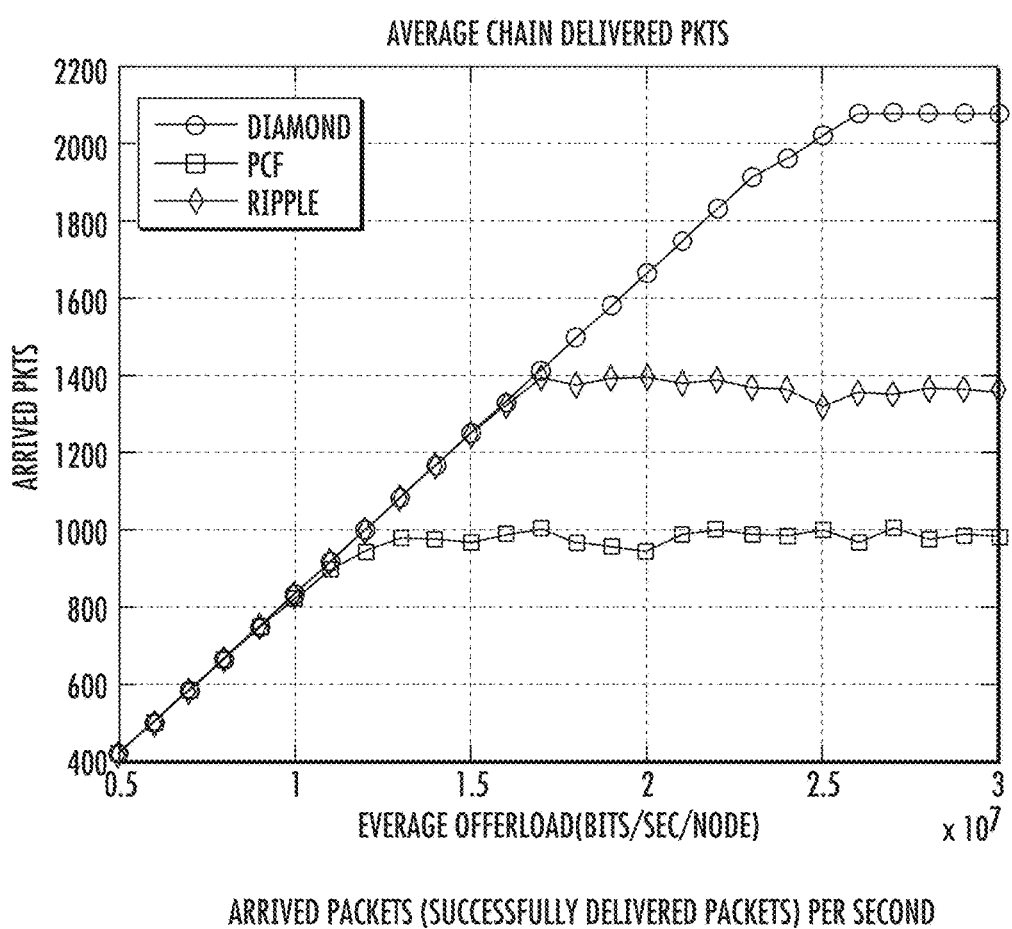
FIGS. 22A-22C shows performance comparisons between diamond-based routing in accordance with the disclosed systems and methods, conventional PCF routing systems and methods, and ripple-only routing systems and methods where FIG. 22A compares arrived packets, FIG. 22B compares average delay, and FIG. 22C compares average loss rate.
Figure 22B:
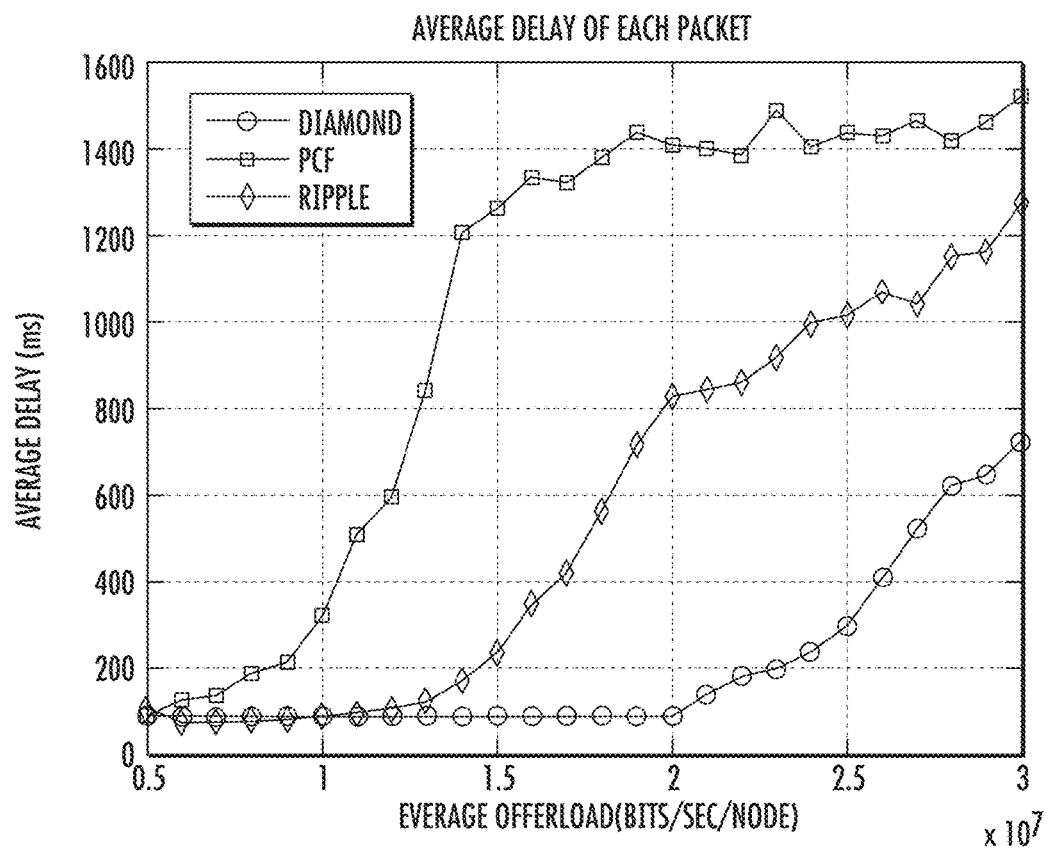
Figure 22C:
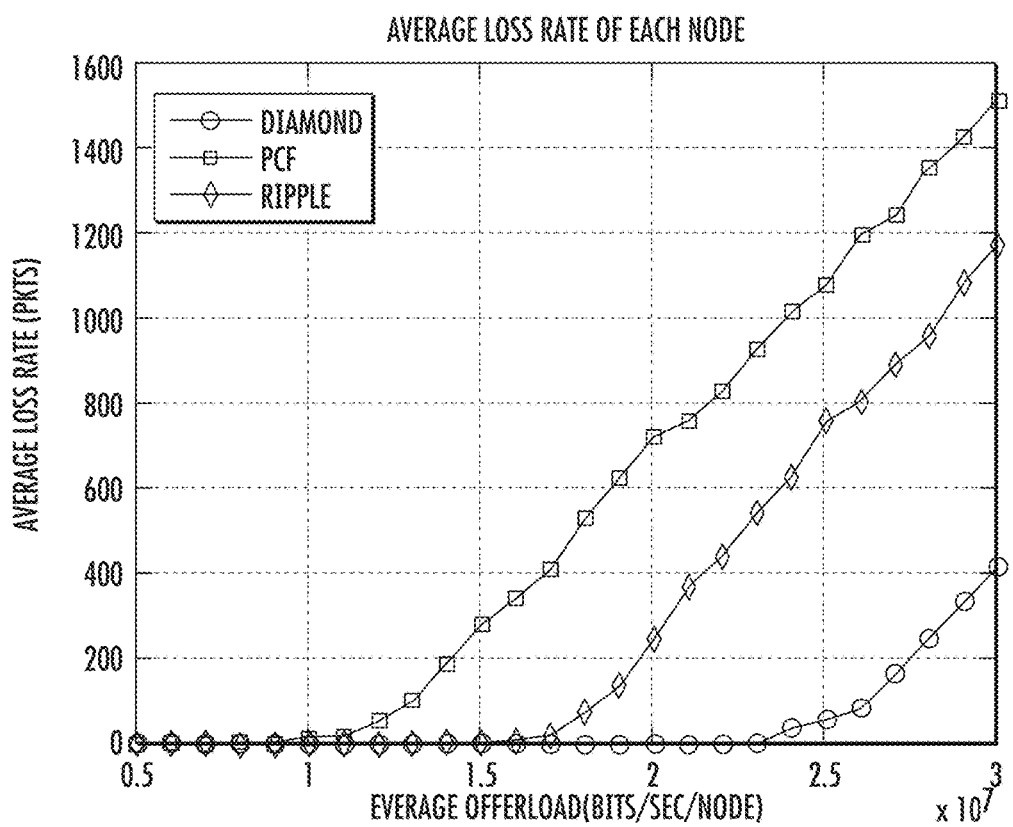

As shown in FIGS. 22A-22C, first, FIG. 22A shows that the disclosed diamond-based routing has a higher successfully arrived packet amount (per second). When the node sending rate is higher than approximately 15 Mbps (adding all 6 beams' traffic amount together; the average is approximately 2.5 Mbps per beam), the disclosed systems and methods can be superior to PCF. When the node traffic is more than approximately 20 Mbps, the disclosed systems and methods can be better than PCF, and also better than the ripple routing scheme. This can be because multi-beam transmissions can be more advantageous in higher traffic load situations, because more nodes in each node can be helpful for heavy loads.

FIG. 22B shows that the disclosed diamond routing can have lower end-to-end routing delay than both schemes. When the node traffic load is higher, the disclosed scheme can thus have an advantage.

FIG. 22C shows that the packet loss rate can have a better performance than PCF when the node traffic is higher than approximately 10 Mbps. After approximately 15 Mbps, the disclosed scheme can be best. This can be because the disclosed diamond-chain routing can fully exploit all beams for transmission, and the amount of traffic in each beam can be proportional to its node quality in that beam direction. Thus, packet loss events can be minimized.

Learning-Enhanced Routing Performance

In one aspect, the performance enhancement after using learning-based algorithms, that is, the RL-based main path routing establishment scheme is described.

The tree-like WMN topology can be assumed as shown in FIG. 19. With the use of Q-learning it can be possible to find a main path with the best overall node quality under fast fading conditions. In this experiment the discount rate ($\gamma$) of the Q-learning system can be set to be approximately 0.5. Each MBDA can have 6 beams.

Figures 23A, 23B, 23C:
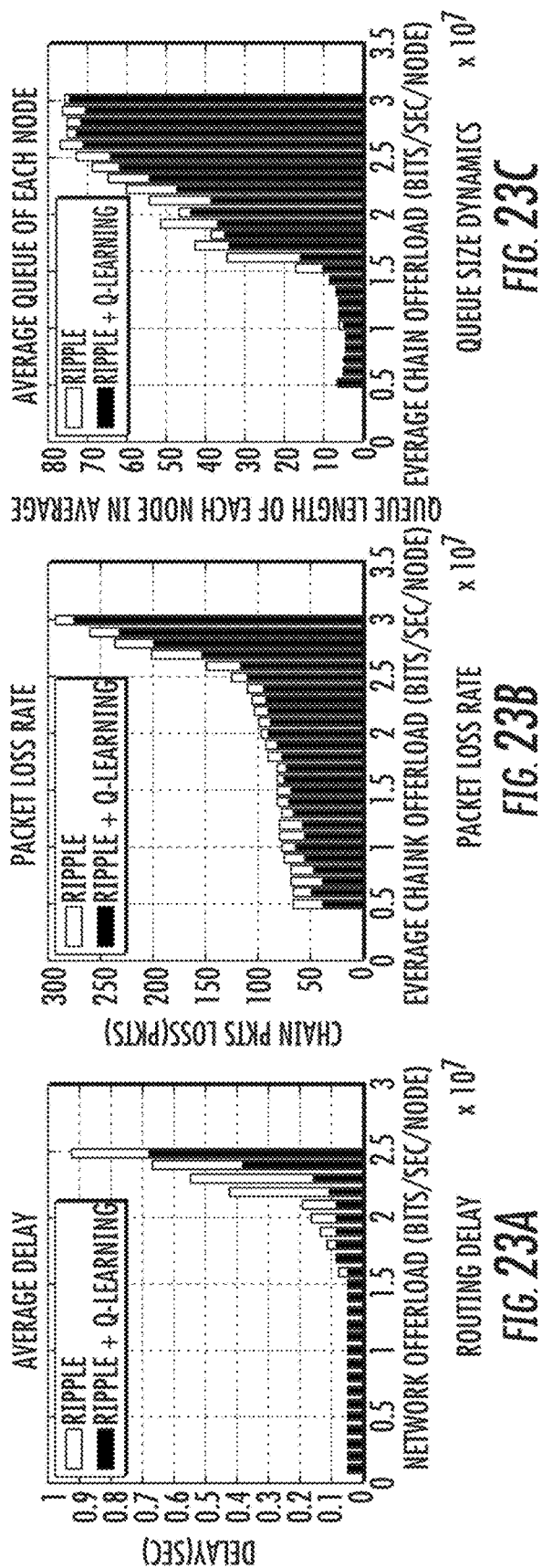
FIGS. 23A-23C show plots of the performance of the routing systems and methods with and without Q-learning.

The comparison of the ripple-based routing performance with and without Q-learning is shown in FIGS. 23A-23C. FIG. 23A shows routing delay: the end-to-end delay performance can be show in FIG. 23A. When the total traffic load in the node is high (for example, greater than approximately 15 Mbps), the learning-based routing can have shorter delay and can be more advantageous. This can be because Q-learning can accurately find the best path as the main path, which can be especially suitable for heavy load communications. When the load is light, the best path might not be as critical. Here again approximately 15 Mbps can refer to the peak traffic amount in a node that may aggregate all traffic from its 6 beams. Thus each beam can have an average traffic load of approximately 2.5 Mbps, which can be typical in multimedia applications. FIG. 23B shows packet loss rate: Q-learning can select the best quality nodes to construct the whole main path. Thus it can have a lower packet loss rate (i.e., higher reliability) than non-learning case. Under all traffic loads the disclosed RL-based scheme has lower loss rate. FIG. 23C shows throughput: the resident packet amount (i.e., queue length) can be used to measure the node throughput performance. Q-learning can have a shorter queue length (especially when the sending data rate is high). This can indicate that each node can more quickly clear out its queued packets. Q-learning can thus find the best path, e.g. the one that can avoid frequent node capture, and thus can better dispatch all buffered packets to multiple beams.

Video Transmission Effects

Figure 24A:
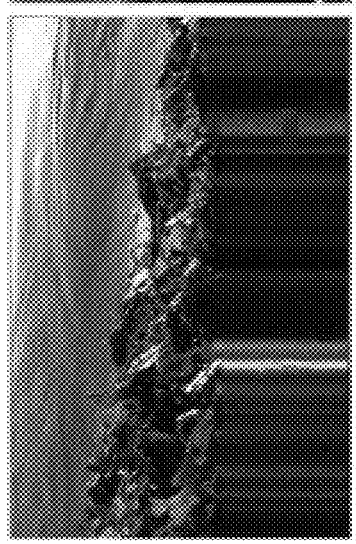
FIGS. 24A-24C show a visual comparison between the three video transmission schemes on an example image.
Figure 24B:
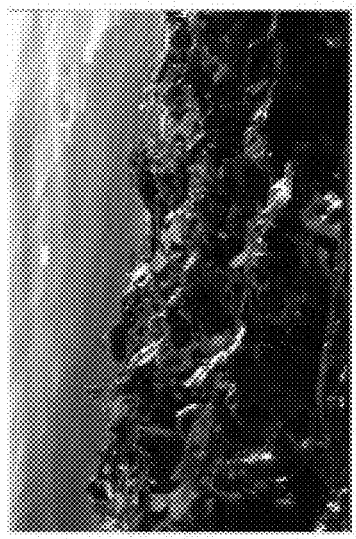
Figure 24C:
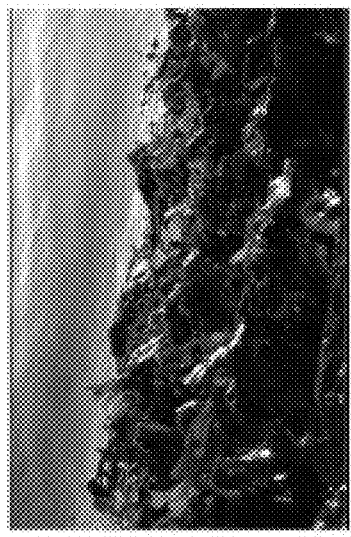

In one aspect of the disclosure, H.264 encoding can be used for video transmission to test the efficiency of the RDC-based routing scheme. The video frame resolution can be, for example, approximately 800×600 pixels; the bit rate can be, for example, approximately 850 kbps; the frames per second rate can be, for example, approximately 60 fps. FIGS. 24A-24C show the received video effect (taking one frame as an example) based on the following three WMN multi-hop transmission schemes: FIG. 24A shows conventional DSR-based routing protocols without using multi-beam routing (i.e. only selecting the shortest path); moreover not using multi-beam oriented MAC in each hop (instead, using general IEEE 802.11 protocols); FIG. 24B shows common DSR-based routing, but using the multi-beam MAC protocol in each ripple-to-ripple communication; and FIG. 24C shows the disclosed RDC routing plus the use of multi-beam MAC in each ripple.

As shown in FIGS. 24A-24C, the case shown in FIG. 24C has the best video resolution because it uses RDC routing to maximize the throughput of the multi-hop routing. Each beam can help to forward part of the rateless coded video packets (symbols). In each ripple, the disclosed multi-beam MAC protocol can use enhanced PCF and DCF for multi-beam delivery capability and also support the video QoS metrics. The case shown in FIG. 24B uses RDC routing. However, each ripple can still use conventional IEEE 802.11 protocols, which can assume omni-directional antennas, and thus exploit one beam for communications. The case shown in FIG. 24A has the worst quality due to its ignorance of multi-beam antennas in both routing and MAC layers.

Figure 25A:
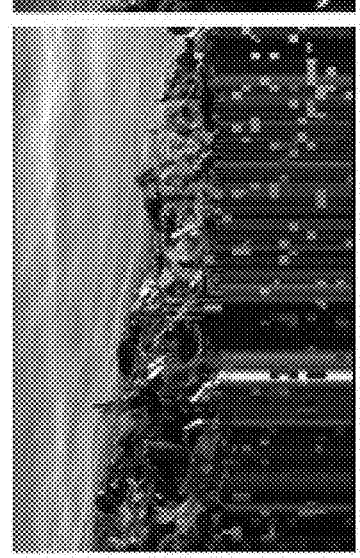
FIGS. 25A-25C show a visual comparison between the three video transmission schemes on an example image including the effects of using AI algorithms.
Figure 25B:
Figure 25C:
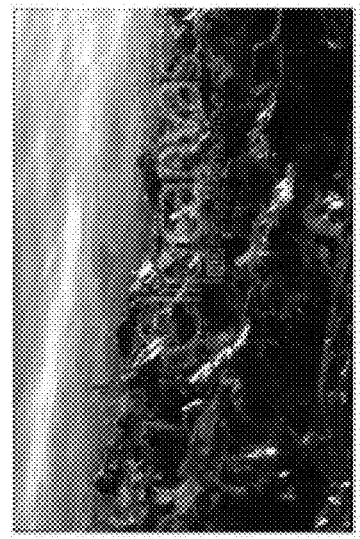

In order to show the advantage of the disclosed learning-based main path selection, a HD video with a higher resolution (approximately 1024×approximately 576) can be transmitted in each ripple. The bit rate is approximately 1.57 Mbps, the frame rate is approximately 60 fps. FIGS. 25A-25C show the comparison result of three cases. Here, the case shown in FIG. 25A shows DSR-based routing, with no diamond chain formation and no learning algorithms used during the routing path search. The case shown in FIG. 25B shows an adoption of the diamond architecture to build multiple paths. However, it does not use a learning-based main path establishment strategy. It uses simple shortest-path routing protocol, like DSR instead. The case shown in FIG. 25C uses the disclosed Q-learning based algorithm to search the main path, and form diamond chain routing topology.

FIGS. 25A-25C show the advantage of using learning-based scheme to build the main path. Such a path can ensure the best overall node quality in the whole diamond chain routing pipe. The worst case, FIG. 25A, can have many packet loss events and the poorest video quality. This can be because it does not use a learning-based routing search strategy and nor the diamond-chain architecture. Instead it uses single-beam for communications in most nodes. Such a strategy cannot meet the HD video delivery demands.

Figure 26:
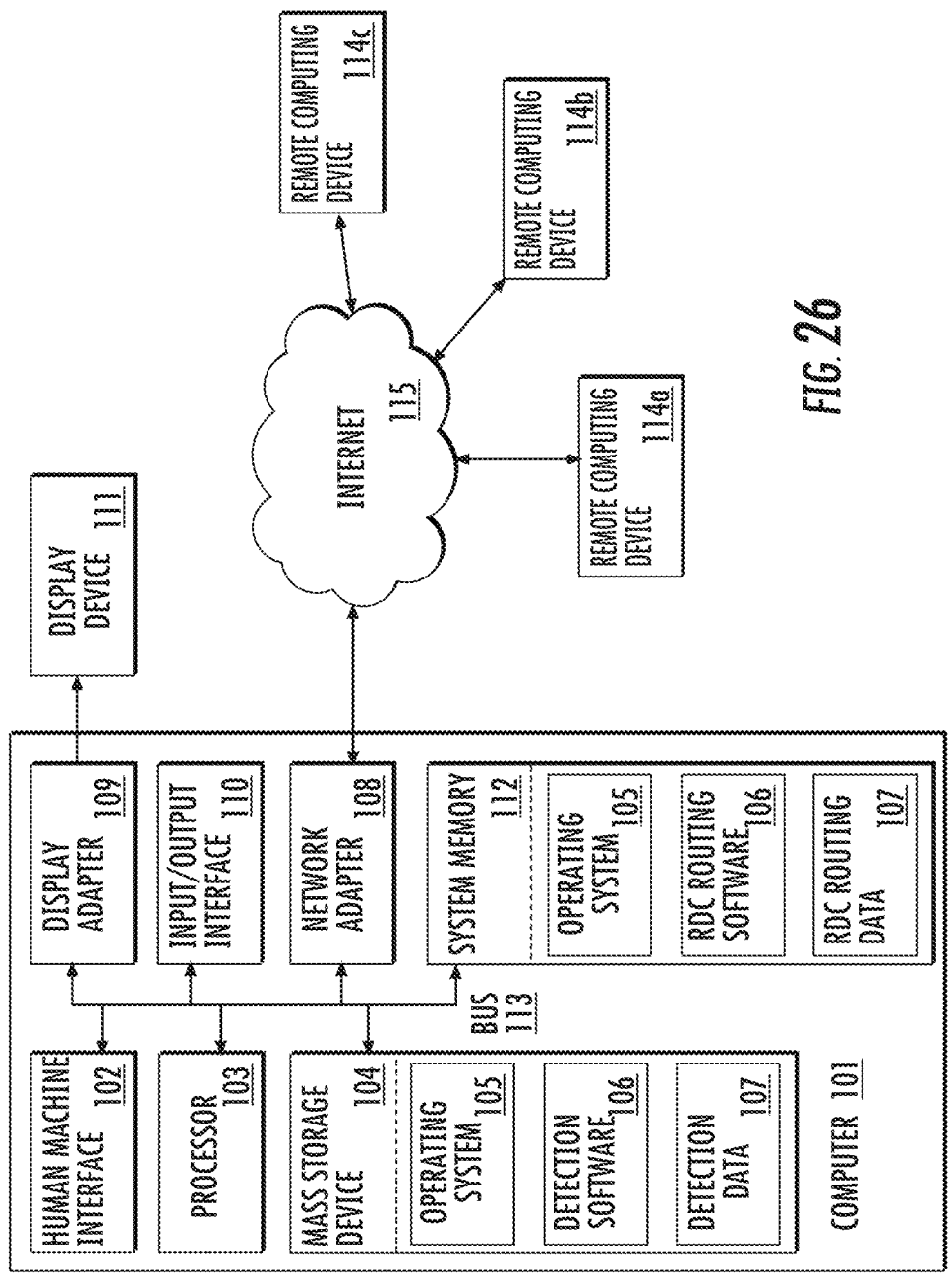
FIG. 26 shows an example computing environment for the disclosed systems and methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the RDC Routing Software 106 as illustrated in FIG. 26 and described below. In one exemplary aspect, the units can comprise a computer 101 as illustrated in FIG. 26 and described below.

FIG. 26 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, RDC Routing software 106, RDC Routing data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as RDC Routing data 107 and/or program modules such as operating system 105 and RDC Routing software 106 that are immediately accessible to and/or are presently operated on by the processing unit 103.

In another aspect, the computer 101 can also comprise other removable/non-removable, volatile/non-volatile computer storage media. By way of example, FIG. 26 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and RDC Routing software 106. Each of the operating system 105 and RDC Routing software 106 (or some combination thereof) can comprise elements of the programming and the RDC Routing software 106. RDC Routing data 107 can also be stored on the mass storage device 104. RDC Routing data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of RDC Routing software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

CONCLUSION

Disclosed herein are systems and methods that describe multi-beam routing protocols based on RDC formation. The systems and methods can use the capacity of multi-beam antennas with the diamond chain routing architecture. The RDC-based routing can comprise a main path and multiple side paths. Rateless codes can be applied to such a multi-beam transmission in order to adapt to fast fading nodes with dynamic channel conditions. AI algorithms (FL and RL) can be implemented to build the main path that consists of the best quality nodes from a statistical distribution perspective. Moreover, ripple-to-ripple schedule control can be designed to achieve pipelined transmissions in different ripples. Finally simulations with real-time video transmissions can be used to validate RDC routing efficiency.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of routing data between a source and a destination in a wireless mesh network (WMN), the method comprising:
    defining a main path between the source and destination in the WMN, wherein the main path comprises a plurality of nodes in the WMN, each node configured to receive and transmit data, wherein at least one node is associated with a multi-beam directional antenna (MBDA);
    defining one or more side paths of the main path, wherein the one or more side paths comprise a plurality of nodes in the WMN, each node configured to receive and transmit data;
    routing data between the source and the destination through the main path and the one or more side paths, wherein at least a portion of the data being routed from the source to the destination diverges from the main path to at least one of the one or more side paths and converges from the at least one of the one or more side paths to the main path while being routed from the source to the destination; and
    using a cumulative distribution function (CDF) metric to characterize a statistical distribution of feedback delays during the routing of the data between the source and the destination through the main path and the one or more side paths, a capture effect metric that is used to characterize a probability of an MBDA being associated with at least one node being captured, and a diamond transmission probability metric that is used to measure a probability of a node becoming part of the main path.

2. The method of claim 1, wherein the at least a portion of the data being routed from the source to the destination diverging from the main path to the one or more side paths and converging from the side path to the main path while being routed from the source to the destination comprises the at least a portion of data being routed from at least one node having a first ripple identifier to a plurality of nodes having a second ripple identifier, and then from the plurality of nodes having the second ripple identifier to at least one node having a third ripple identifier.

3. The method of claim 1, wherein the method further comprises a multi-beam-oriented transmission control scheme that is used to synchronize beam communication associated with the MBDA during the routing of the data between the source and the destination through the main path and the one or more side paths.

4. The method of claim 1, wherein the method further comprises the CDF metric, the capture effect metric, and the diamond transmission probability metric being adjusted based on different quality-of-service (QoS) requirements associated with the data.

5. The method of claim 1, wherein fuzzy logic (FL) is used to obtain a fused metric that comprises the CDF metric, the capture effect metric, and the diamond transmission probability metric, wherein the fused metric measures a dynamic node quality of at least one node, wherein the fused metric is used for a reward calculation in a reinforcement learning (RL)-based path search.

6. The method of claim 5, wherein the FL further comprises a Simple Additive Weighting Method (SAW) that includes a decision matrix, and the decision matrix comprises weights that are adjusted based on different QoS requirements for the data.

7. The method of claim 1, wherein online learning is used while routing data between the source and the destination through the main path and the one or more side paths, wherein the CDF metric is obtained through the online learning, and wherein the online learning algorithm comprises Gaussian approximation or Maximum-Likelihood (ML) estimation.

8. The method of claim 1, wherein a neighbor table is associated with a node and the neighbor table contains information about one or more accessible one-hop and one or more two-hop neighbor nodes from the said node and one or more beam IDs through which the said node can reach one or more of the one-hop neighbor nodes and the two-hop neighbor nodes.

9. The method of claim 1, wherein a Q-learning process is implemented for the routing of the data between the source and the destination in the WMN, said Q-learning process comprises a Markov decision process (MDP) process.

10. The method of claim 1, wherein the routing of the data between the source and the destination in the WMN is determined by maximizing expected rewards of all the nodes and a Bellman equation is used to perform an online policy search based on one or more cumulative rewards of all the nodes.

11. A system for routing data between a source and a destination in a WMN, the system comprising:
a plurality of nodes, wherein a portion of the nodes are associated with an MBDA;
a processor configured to execute computer-implemented code;
wherein the processor executes the computer-implemented code to:
define a main path between the source and destination in the WMN, wherein the main path comprises a portion of the plurality of nodes in the WMN, each node configured to receive and transmit data;
define one or more side paths of the main path, wherein the one or more side paths comprise a portion of the plurality of nodes in the WMN, each node configured to receive and transmit data;
route data between the source and the destination through the main path and the one or more side paths, wherein at least a portion of the data being routed from the source to the destination diverges from the main path to at least one of the one or more side paths and converges from the at least one of the one or more side paths to the main path while being routed from the source to the destination; and
determine a cumulative distribution function (CDF) metric to characterize a statistical distribution of feedback delays during the routing of the data between the source and the destination through the main path and the one or more side paths, to determine a capture effect metric that is used to characterize a probability of an MBDA being associated with at least one node being captured, and to determine a diamond transmission probability metric that is used to measure a probability of a node becoming part of the main path.

12. The system of claim 11, wherein the at least a portion of the data being routed from the source to the destination diverging from the main path to the one or more side paths and converging from the side path to the main path while being routed from the source to the destination comprises the at least a portion of data being routed from at least one node having a first ripple identifier to a plurality of nodes having a second ripple identifier, and then from the plurality of nodes having the second ripple identifier to at least one node having a third ripple identifier.

13. The system of claim 11, wherein the system further comprises the processor executing the computer-implemented code to implement a multi-beam-oriented transmission control scheme that is used to synchronize beam communication associated with the MBDA during the routing of the data between the source and the destination through the main path and the one or more side paths.

14. The system of claim 11, wherein the system further comprises the processor executing the computer-implemented code to adjust the CDF metric, the capture effect metric, and the diamond transmission probability metric based on different quality-of-service (QoS) requirements associated with the data.

15. The system of claim 11, wherein the system further comprises the processor executing the computer-implemented code to implement fuzzy logic (FL) to obtain a fused metric that comprises the CDF metric, the capture effect metric, and the diamond transmission probability metric, wherein the fused metric measures a dynamic node quality of at least one node, wherein the fused metric is used for a reward calculation in a reinforcement learning (RL)-based path search.

16. The system of claim 11, wherein the system further comprises the processor executing the computer-implemented code to implement online learning while routing data between the source and the destination through the main path and the one or more side paths, wherein the CDF metric is obtained through the online learning, and wherein the online learning algorithm comprises Gaussian approximation or Maximum-Likelihood (ML) estimation.

17. The system of claim 11, wherein a neighbor table is associated with a node and the neighbor table contains information about one or more accessible one-hop and one or more two-hop neighbor nodes from the said node and one or more beam IDs through which the said node can reach one or more of the one-hop neighbor nodes and the two-hop neighbor nodes.

18. The system of claim 15, wherein the FL further comprises a Simple Additive Weighting Method (SAW), wherein the SAW comprises a decision matrix, and wherein the decision matrix comprises weights that are adjusted based on different QoS requirements for the data.

19. The system of claim 11, wherein the system further comprises the processor executing the computer-implemented code to implement a Q-learning process for the routing of the data between the source and the destination in the WMN and wherein the Q-learning comprises a Markov decision process (MDP) process.

20. The system of claim 11, wherein the routing of the data between the source and the destination in the WMN is determined by maximizing expected rewards of all the nodes, wherein a Bellman equation to perform an online policy search based on one or more cumulative rewards of all the nodes.

* * * * *